(12) United States Patent
Kuramitsu

(10) Patent No.: US 7,221,903 B2
(45) Date of Patent: May 22, 2007

(54) COMMUNICATIONS TERMINAL DEVICE ALLOWING CONTENT RECEPTION AND VOICE COMMUNICATION

(75) Inventor: Mami Kuramitsu, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 356 days.

(21) Appl. No.: 10/405,248

(22) Filed: Apr. 3, 2003

(65) Prior Publication Data
US 2004/0204020 A1   Oct. 14, 2004

(30) Foreign Application Priority Data
Apr. 5, 2002   (JP) .............................. 2002-104067

(51) Int. Cl.
*H04H 7/10* (2006.01)
(52) U.S. Cl. .................. 455/3.06; 455/3.04; 379/201.1
(58) Field of Classification Search ............. 455/414.3, 455/414.4, 557, 566, 3.06, 3.04, 414.1; 379/201.1
See application file for complete search history.

(56) References Cited

U.S. PATENT DOCUMENTS

| | | | |
|---|---|---|---|
| 5,241,428 A * | 8/1993 | Goldwasser et al. ........ 386/109 |
| 5,706,388 A | 1/1998 | Isaka |
| 6,259,441 B1 * | 7/2001 | Ahmad et al. ............... 715/720 |
| 6,269,101 B1 * | 7/2001 | Gerszberg et al. .......... 370/404 |
| 6,400,804 B1 * | 6/2002 | Bilder .......................... 379/76 |
| 6,768,722 B1 * | 7/2004 | Katseff et al. ............... 370/260 |
| 2001/0036254 A1 * | 11/2001 | Davis et al. ............... 379/67.1 |
| 2001/0038690 A1 * | 11/2001 | Palmer et al. .......... 379/218.01 |
| 2002/0040475 A1 * | 4/2002 | Yap et al. ..................... 725/39 |

FOREIGN PATENT DOCUMENTS

| | | |
|---|---|---|
| GB | 2 343 074 | 4/2000 |
| JP | 2001-333334 | 11/2001 |

* cited by examiner

*Primary Examiner*—Edward F. Urban
*Assistant Examiner*—Tu X. Nguyen
(74) *Attorney, Agent, or Firm*—Wenderoth, Lind & Ponack, L.L.P.

(57) ABSTRACT

In a terminal, a content reproduction section reproduces a video signal and an audio signal from a received transport stream. A telephony processing section performs processing necessary for voice communication. A status detection section detects a time point at which the status of voice communication changes. A control section writes the transport stream received by the content reproduction section in a content storage section when the status detection section detects start of voice communication, and reads and sends the transport stream stored in the content storage section to the content reproduction section according to a predetermined timing. The content reproduction section reproduces a video signal and an audio signal from the transport stream read by the control section.

6 Claims, 21 Drawing Sheets

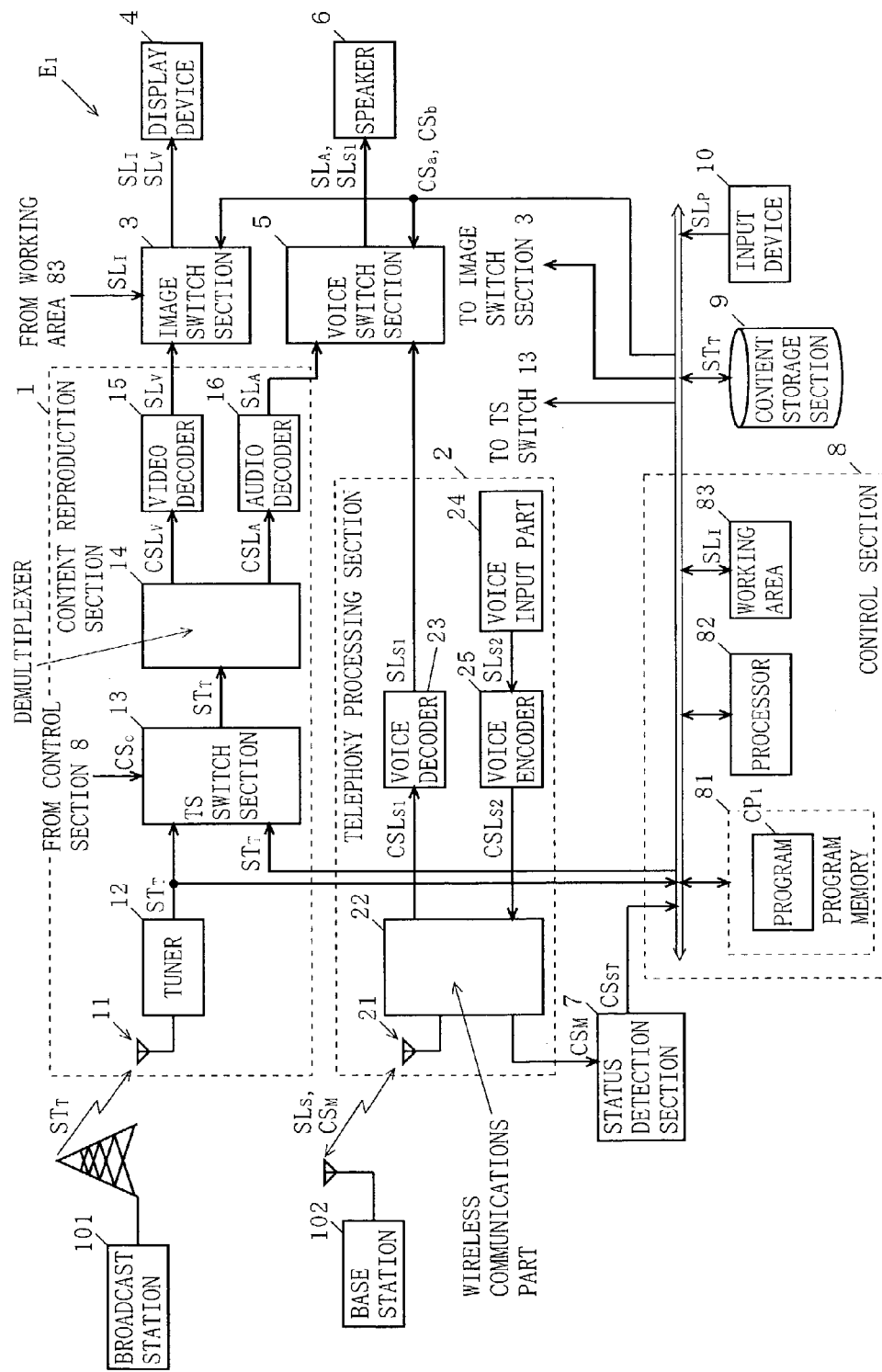

F I G. 1 4
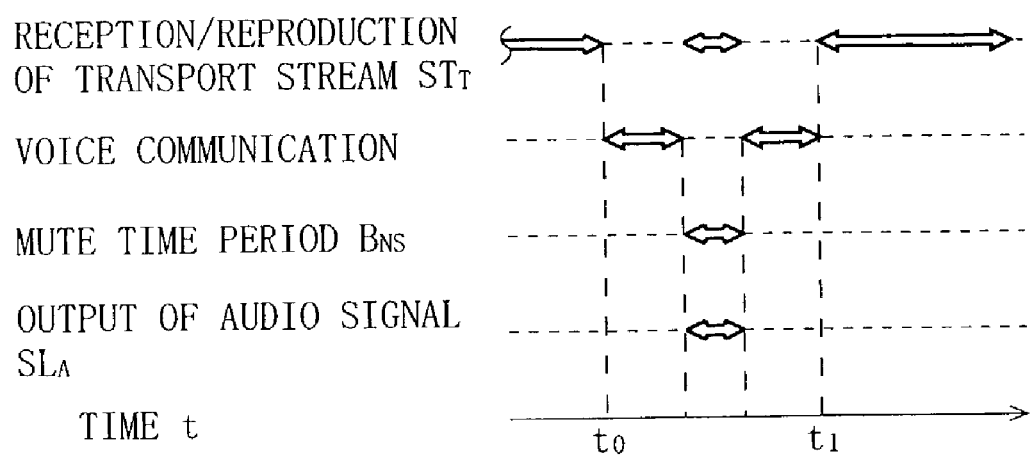

COMMUNICATIONS TERMINAL DEVICE ALLOWING CONTENT RECEPTION AND VOICE COMMUNICATION

BACKGROUND OF THE INVENTION

1. Field of the Invention

The present invention relates to communications terminal devices, and more particularly, to a communications terminal device having a content reception function and a voice communication function.

2. Description of the Background Art

Terrestrial digital broadcasting is scheduled to commence in Japan first in the three biggest metropolitan areas in 2003 and then nationwide in 2006. A feature of terrestrial digital broadcasting is that mobile reception of contents is possible. As for mobile communications, the third-generation cellular phone service started in 2001, enabling distribution of moving pictures and a portable videophone. Under the present situation as described above, there has been recently announced a concept of a communications terminal device having both the content reception function and the voice communication function. However, when a voice call arrives while viewing a content with such a communications terminal device, the user tends to choose to answer the call rather than continuing viewing the content. In the opposite case, that is, if a content that the user desires to view has started while the user is engaged in voice communication using a mobile communications terminal device, the user tends to continue the voice communication.

There is known in the art a conventional television which receives a video signal externally broadcast on the channel selected by the viewer, reproduces the received video signal, and outputs a video represented by the received video signal. The conventional television includes a built-in modem which outputs a status signal when a fixed telephone receives a call during the reception of the video signal. In response to the status signal, the conventional television begins recording of the currently receiving video signal in a storage device built therein (that is, performs video recording). After the voice communication is finished, the conventional television reproduces the video signal recorded in the storage device. Thus, the viewer can view the video missed due to the voice communication.

The conceptual communications terminal device has a problem that the user is not allowed to view the content at least until the voice communication is finished. As another problem, the conventional television described above needs to have a storage device with a large capacity capable of storing a long content. However, the communications terminal device described above, which is a mobile unit, is allowed to include only a small-capacity storage device and thus cannot store a long content therein. In view of this, it is difficult to implement the technology developed for televisions as described above for a mobile communications terminal device without substantial modifications.

SUMMARY OF THE INVENTION

Therefore, an object of the present invention is to provide a communications terminal device capable of outputting a portion of a content missed by the user due to voice communication at a time shifted from the actual broadcast time.

Another object of the present invention is to provide a communications terminal device capable of recording/reproducing a portion of a content missed by the user due to voice communication by a technique suitable for mobile units.

The present invention has the following features to attain the objects mentioned above.

A first aspect of the present invention is directed to a communications terminal device including: a reproduction section operable to receive and reproduce a content transmitted from an external source; a telephony processing section operable to receive and reproduce at least voice of a party on the other end of voice communication; a status detection section operable to detect a status change of voice communication; a storage section operable to store the content received by the reproduction section; a write section operable to write the content received by the reproduction section in the storage section while the status detection section detects a status change of voice communication; and a read section operable to read the content stored in the storage section. The reproduction section is further operable to reproduce the content read by the read section. Typically, the reproduction section receives a program composed of a video and audio from a remote broadcast station as a content. As described above, the communications terminal device stores the received content in the storage section while the user is engaged in voice communication, and reads and reproduces the stored content after the voice communication is finished. Thus, the communications terminal device can provide the user with the portion of the content the user failed to view due to the voice communication.

Preferably, the read section is operable to start read of the content stored in the storage section while the status detection section detects a next status change of voice communication. By this processing, reproduction of the content automatically starts. It is therefore possible to provide a communications terminal device having more enhanced operability.

Typically, the status detection section is operable to detect an incoming call at the telephony processing section as a start point of voice communication, and detect that the telephony processing section has disconnected voice communication. Alternatively, the status detection section is operable to detect that the telephony processing section has entered an off-hook state as a start point of voice communication, and detect that the telephony processing section has entered an on-hook state as an end point of voice communication. In this way, the status can be detected using the voice communications function originally possessed by the communications terminal device. It is therefore possible to reduce the number of components of the communications terminal device and minimize the fabrication cost.

Furthermore, the telephony processing section is operable to receive and reproduce an image of the party on the other end of voice communication.

Alternatively, the reproduction section is operable to reproduce the content read by the read section at n times speed (n is a positive number satisfying n>1), and also is operable to receive and reproduce the content transmitted from the external source when the read by the read section is completed. The communications terminal device reproduces the receiving content once substantially no data is left in the storage section. Therefore, it is unnecessary to store all the content received after the start of voice communication in the storage section. This enables recording/reproduction suitable for a communications terminal device allowed to include only a small-capacity memory.

The communications terminal device may further include: an image generation section operable to generate image information relating to voice communication; and an image combining section operable to generate combined image information by combining the content received by the reproduction section and the image information generated by the image generation section while the status detection section detects a status change of voice communication. With these components, the user can view the content even during voice communication. It is therefore possible to realize a communications terminal device having further enhanced operability.

The reproduction section is further operable to receive text data relating to the content, and the image combining section is operable to generate the combined image information to which the received text data is additionally included. The user can view the text data even during voice communication. It is therefore possible to realize a communications terminal device having further enhanced operability.

The image combining section is operable to generate the combined image information to which an image of the party on the other end of the voice communication is additionally included. Furthermore, when the reproduction section can capture an image of the user, the image combining section can generate the combined image information to which the captured image of the user is additionally included.

When the reproduction section can reproduce at least audio constituting the received content, the communications terminal device may further include: a mute detection section operable to detect a mute time period of voice communication; and a voice switch section operable to output the audio reproduced by the reproduction section during the mute time period detected by the mute detection section. The voice switch section can further output a voice signal reproduced by the telephony processing section when the mute detection section detects no mute time period. This enables the user to hear audio constituting the content even during voice communication. It is therefore possible to provide a communications terminal device having further enhanced operability.

The communications terminal device further includes first and second speakers operable to output the audio reproduced by the reproduction section and the voice reproduced by the telephony processing section while a status change of voice communication is detected by the status detection section. This enables the user to hear audio of the content during voice communication.

The communications terminal device further includes a start detection section operable to detect a predetermined content transmission start time. The write section can further store the content received by the reproduction section while a transmission status change is detected by the start detection section. Thus, the communications terminal device can provide the user with the portion of the content the user failed to view and hear due to voice communication.

For time-shifted reproduction, the read section can further read the content stored in the storage section from a head thereof during the progress of writing of the content in the storage section by the write section. Thus, the communications terminal device can provide the user with the portion of the content the user failed to view and hear due to voice communication.

The communications terminal device further includes: an end time determination section operable to determine an end time of the content received by the reproduction section and currently being written in the storage section; and a write terminating section operable to terminate the write of the content in the storage section when the end time determination section determines that the end time has passed. With the write terminating section, the write of the object content in the storage section can be terminated once the content are finished, even during voice communication. This enables recording/reproduction suitable for a communications terminal device allowed to include only a small-capacity memory.

The communications terminal device further includes a remaining capacity detection section operable to detect the remaining recording capacity of the storage section. The write section can further determine a bit rate based on the remaining capacity detected by the remaining capacity detection section, and write the content received by the reproduction section based on the determined bit rate. As described above, the bit rate of the content can be controlled according to the remaining capacity of the storage section. This enables recording/reproduction suitable for a communications terminal device allowed to include only a small-capacity memory.

A second aspect of the present invention is a computer program for providing a function of broadcast reception and a function of voice communication to a computer, including the steps of: receiving and reproducing a content transmitted from an external source; receiving and reproducing at least voice of a party on the other end of voice communication; detecting a status change time point of the voice communication; writing the content received in the step of receiving and reproducing a content while a status change of voice communication is detected in the step of detecting; and reading the content written in the step of writing. The step of receiving and reproducing a content can further reproduce the content read in the step of reading. Typically, the computer program is recorded in a recording medium.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the construction of a terminal device $E_1$ of an embodiment of the present invention.

FIG. 14 is a timing chart showing an outline of an operation of the terminal device $E_4$ of FIG. 13.

DESCRIPTION OF THE PREFERRED EMBODIMENTS

Figure 2:
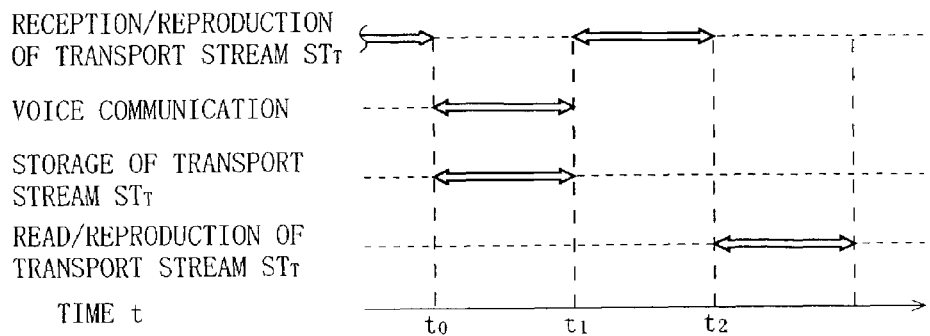
FIG. 2 is a timing chart showing an outline of an operation of the terminal device $E_1$ of FIG. 1.

FIG. 1 is a block diagram showing the construction of a mobile communications terminal device (hereinafter, referred to as a terminal device for simplification) $E_1$ of an embodiment of the present invention. In FIG. 1, the terminal device $E_1$ includes a content reproduction section 1, a telephony processing section 2, an image switch section 3, a display device 4, a voice switch section 5, a speaker 6, a status detection section 7, a control section 8, a content storage section 9, and an input device 10.

The content reproduction section 1 receives a transport stream $ST_T$ which is composed of at least one channel and broadcast from a terrestrial digital broadcast station 101, and reproduces a content from the received transport stream $ST_T$. In this embodiment, the content are assumed to be a TV program broadcast in a scheduled time frame according to a timetable made up by the broadcasting provider, for example. The TV program is essentially composed of a video represented by a video signal $SL_V$ and audio represented by an audio signal $SL_A$. The video signal $SL_V$ and the audio signal $SL_A$ are encoded at the broadcast station 101 according to Moving Picture Experts Group (MPEG). The resultant encoded video signal $CSL_V$ and encoded audio signal $CSL_A$ are multiplexed for generating the transport stream $ST_T$. The content reproduction section 1 is also made operable to reproduce the video signal $SL_V$ and the audio signal $SL_A$ from the transport stream $ST_T$ read from the content storage section 9 (described below) in an event that voice communication is started during reception/reproduction of contents. To implement the reception/reproduction of contents as described above, the content reproduction section 1 includes an antenna 11, a tuner 12, a TS switch section 13, a demultiplexer 14, a video decoder 15, and an audio decoder 16.

The antenna 11 receives transport streams $ST_T$ broadcast from a plurality of broadcast stations 101 (a single station is shown in FIG. 1), and outputs the received streams to the tuner 12. The tuner 12 selects a transport stream $ST_T$ transmitted on the channel designated by the user among ones transmitted on the channels receivable by the antenna 11, and outputs the selected transport stream $ST_T$ to both the TS switch section 13 and the control section 8. The TS switch section 13 outputs the transport stream $ST_T$ sent from the tuner 12 to the demultiplexer 14. The TS switch section 13 also receives the transport stream $ST_T$ read from the content storage section 9 by the control section 8, and outputs the received transport stream $ST_T$ to the demultiplexer 14. The TS switch section 13 switches these two input lines in accordance with a control signal $CS_c$ sent from the control section 8. The demultiplexer 14 demultiplexes the transport stream $ST_T$ output from the TS switch section 13 into the encoded video signal $CSL_V$ and the encoded audio signal $CSL_A$, which are sent to the video decoder 15 and the audio decoder 16, respectively. The video decoder 15 decodes the encoded video signal $CSL_V$ received from the demultiplexer 14 in accordance with MPEG, and reproduces the video signal $SL_V$ representing a video constituting the content. The reproduced video signal $SL_V$ is output to the image switch section 3. The audio decoder 16 decodes the encoded audio signal $CSL_A$ received from the demultiplexer 14 in accordance with MPEG, and reproduces the audio signal $SL_A$ representing audio synchronizing with the video and constituting the content. There produced audio signal $SL_A$ is output to the voice switch section 5.

The telephony processing section 2 communicates with a base station 102 included in a mobile communication system, and receives/sends a multiplexed signal $SL_S$ from/to the base station 102. The multiplexed signal $SL_S$, multiplexed and encoded according to a multiplexing scheme and a voice encoding scheme adopted by the mobile communication system, includes at least an encoded voice signal $CSL_{S1}$ representing the speech of the party with which the user speaks using the terminal device $E_1$ and an encoded voice signal $CSL_{S2}$ representing the speech of the user. To implement the voice communication described above, the telephony processing section 2 typically includes an antenna 21, a wireless communications part 22, a voice decoder 23, a voice input part 24, and a voice encoder 25.

The antenna 21 receives the multiplexed signal $SL_S$ sent from the base station 102. The wireless communications part 22, as a demultiplexer, demultiplexes the multiplexed signal $SL_S$ to obtain the encoded voice signal $CSL_{S1}$, and outputs the demultiplexed signal to the voice decoder 23. The voice decoder 23 decodes the encoded voice signal $CSL_{S1}$ output from the wireless communications part 22 according to the voice encoding scheme described above, and outputs the resultant voice signal $SL_{S1}$ to the voice switch section 5. The voice input part 24 generates a voice signal $SL_{S2}$ representing the speech of the user, and outputs the generated signal to the voice encoder 25. The voice encoder 25 encodes the voice signal $SL_{S2}$ received from the voice input part 24 according to the voice encoding scheme described above, and outputs the resultant encoded voice signal $CSL_{S2}$ to the wireless communications part 22. The wireless communications part 22, as a multiplexer, multiplexes the encoded voice signal $CSL_{S2}$ received from the voice encoder 25 for generating the multiplexed signal $SL_S$, and outputs the generated signal $SL_S$ to the antenna 21. The antenna 21 sends the multiplexed signal $SL_S$ received from the wireless communications part 22 to the base station 102.

The image switch section 3 outputs the video signal $SL_V$ received from the video decoder 15 to the display device 4. The image switch section 3 also receives an image signal $SL_I$, which is used during voice communication typically for displaying the current time, the radio-wave reception state, and the amount of remaining battery time. The image signal $SL_I$ is generated by the control section 8. The image switch section 3 switches between the output of the input video signal $SL_V$ and the output of the input image signal $SL_I$ in accordance with the control signal $CS_a$ or $CS_b$ sent from the control section 8. The display device 4 displays a video or an image in accordance with the video signal $SL_V$ or the image signal $SL_I$ output from the image switch section 3.

The voice switch section 5 outputs the audio signal $SL_A$ sent from the audio decoder 16 to the speaker 6. The voice switch section 5 also outputs the voice signal $SL_{S1}$ sent from the voice decoder 23 to the speaker 6. The voice switch section 5 switches between the output of the input audio signal $SL_A$ and the output of the input voice signal $SL_{S1}$ in accordance with the control signal $CS_a$ or $CS_b$ sent from the control section 8. The speaker 6 outputs the audio synchronizing with the video or the speech of the party on the other end of the voice communication.

In the mobile communication system, in addition to the multiplexed signal $SL_S$ described above, various control signals $CS_M$, such as those indicating an incoming call and disconnection of voice communication, are exchanged between the terminal device $E_1$ and the base station 102. The wireless communications part 22 sends and receives such control signals $CS_M$ via the antenna 21. Such control signals $CS_M$, received or to be sent, are also supplied to the status detection section 7 from the wireless communications part 22. The status detection section 7 decodes the control signals $CS_M$ sent from the wireless communications part 22, and outputs a signal $CS_{ST}$ (hereinafter, referred to as status notification) indicating status changes of voice communication, which are typically an incoming call or disconnection of the voice communication, to the control section 8.

To control the components described above, the control section 8 includes a program memory 81, a processor 82, and a working area 83. The program memory 81 stores an operating system (OS), computer programs for receiving/reproducing of contents, and computer programs for voice communication processing. In this embodiment, these programs are collectively referred to as a program $CP_1$ for the sake of convenience. The processor 82 executes the program $CP_1$, using the working area 83.

The content storage section 9 stores the transport stream $ST_T$ transferred from the tuner 12 under control of the control section 8. The input device 10 outputs, to the control section 8, a signal $SL_P$ (hereinafter, referred to as start instruction) for instructing read of the transport stream $ST_T$ stored in the content storage section 9 in response to an input from the user.

Next, an operation of the terminal device $E_1$ described above is outlined with reference to FIG. 2. In FIG. 2, assuming that a call arrives when the terminal device $E_1$ receives/reproduces the transport stream $ST_T$ (that is, content) at time $t_0$, the user is prevented from viewing the content from time $t_0$ until the voice communication is finished. The terminal device $E_1$ therefore stores the transport stream $ST_T$ received during the voice communication in the content storage section 9 while the user is prevented from viewing the content. Assuming that the voice communication is finished and the terminal device $E_1$ disconnects it at time $t_1$, the terminal device $E_1$ restarts the reception/reproduction of the transport stream $ST_T$ at time $t_1$, and the reception/reproduction thereof is finished at time $t_2$. After time $t_2$, the start instruction $SL_P$ described above is generated. In response to the start instruction $SL_P$, the terminal device $E_1$ reads the transport stream $ST_T$ stored in the content storage section 9, and reproduces the transport stream $ST_T$. In this way, the user can view the portion of the content missed due to the voice communication.

Figure 3:
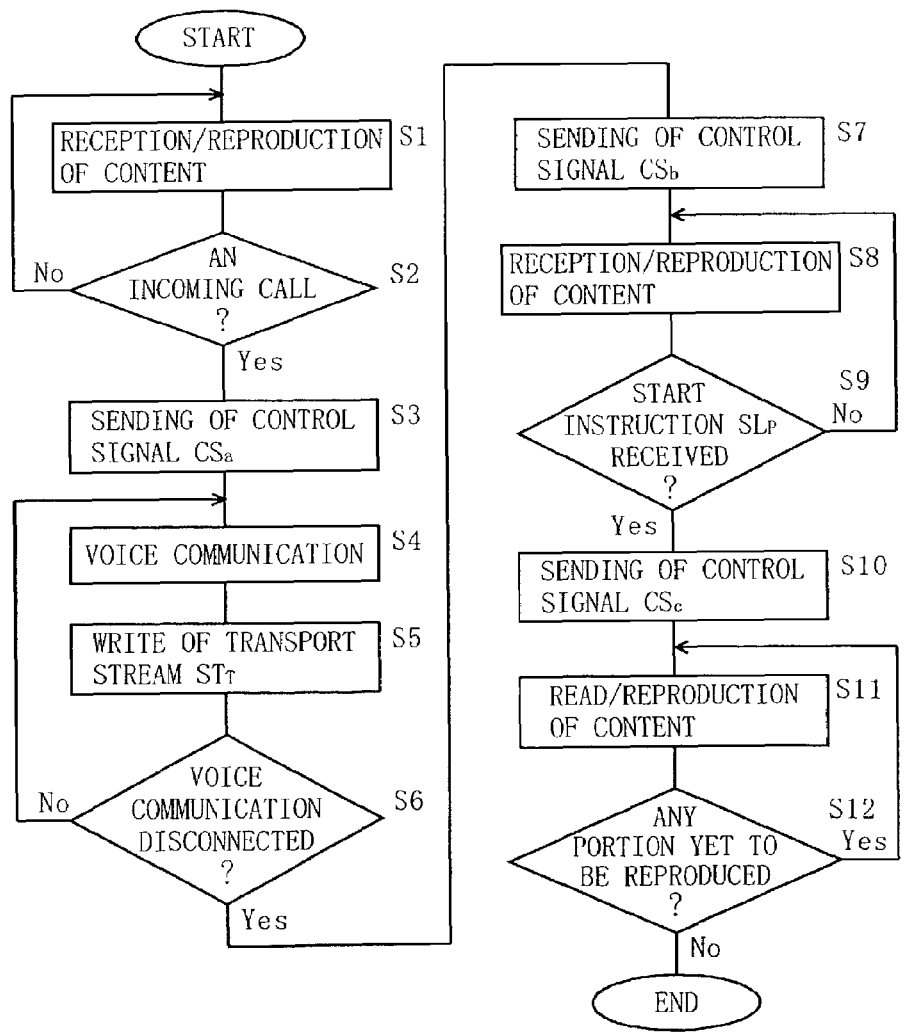
FIG. 3 is a flowchart showing a detailed operation of the terminal device $E_1$ of FIG. 1.

The operation outlined above with reference to FIG. 2 is described in detail with reference to the flowchart of FIG. 3. In FIG. 3, the processor 82 executes the program for receiving/reproducing of contents, which is included in the program $CP_1$. During the execution of the program $CP_1$, if the user designates a channel in order to view a desired content (hereinafter, referred to as an object content), the following setting is performed by the processor 82. That is, the designated channel to be received by the tuner 12 is set, the TS switch section 13 is set to the state ready to receive the output of the tuner 12, the image switch section 3 is set to the state ready to receive the output of the video decoder 15, and the voice switch section 5 is set to the state ready to receive the output of the audio decoder 16. After this setting, the terminal device $E_1$ reproduces the video signal $SL_V$ and the audio signal $SL_A$ from the received transport stream $ST_T$, and outputs a video and audio synchronizing with the video (step S1). More specifically, the tuner 12 selects a transport stream $ST_T$ transmitted via the set channel among the transport streams $ST_T$ output from the antenna 11, and outputs the selected transport stream $ST_T$ to the TS switch section 13. The TS switch section 13 outputs the input transport stream $ST_T$ to the demultiplexer 14. The demultiplexer 14 demultiplexes the input transport stream $ST_T$, and outputs the resultant encoded video signal $CSL_V$ and encoded audio signal $CSL_A$ to the video decoder 15 and the audio decoder 16, respectively. The video decoder 15 decodes the input encoded video signal $CSL_V$, and outputs the resultant video signal $SL_V$ to the display device 4 via the image switch section 3. The audio decoder 16 decodes the input encoded audio signal $CSL_A$, and outputs the resultant audio signal $SL_A$ to the speaker 6 via the voice switch section 5. By the processing described above, a video constituting the object content is displayed on the display device 4 while audio synchronizing with the displayed video is output from the speaker 6. As is found from FIG. 1, the output transport stream $ST_T$ is also sent to the control section 8 from the tuner 12. In step S1, however, the control section 8 preferably abandons the input transport stream $ST_T$ without transferring it to the content storage section 9. A switch (not shown) may be provided somewhere between the tuner 12 and the TS switch section 13 so as to block the transport stream $ST_T$ output from the tuner 12 from being input into the control section 8 in step S1.

Subsequent to step S1, the processor 82 determines whether or not status notification $CS_{ST}$ indicating a status change of the voice communication, that is, an incoming call, has been received from the status detection section 7 (step S2). If not received, indicating no voice communication processing is necessary, execution of step S1 is repeated. If status notification $CS_{ST}$ indicating an incoming call has been received, the processor 82 first generates the control signal $CS_a$, and sends the signal to the image switch section 3 for switching between the two input lines and the voice switch section 5 for switching between the two input lines (step S3). With this control signal $CS_a$, the image switch section 3 is set to the state ready to receive the output of the control section 8, and the voice switch section 5 is set to the state ready to receive the output of the voice decoder 23. The processor 82 then starts execution of the program for voice communication processing included in the program $CP_1$. The terminal device $E_1$ exchanges the multiplexed signal $SL_S$ with the base station 102 for voice communication, reproduces the voice signal $SL_{S1}$ included in the multiplexed signal $SL_S$, and outputs the speech of the caller. The terminal device $E_1$ also generates the encoded voice signal $CSL_{S2}$ from the voice signal $SL_{S2}$ representing the speech of the user, multiplexes the encoded voice signal $CSL_{S2}$, and sends the resultant multiplexed signal $SL_S$ to the base station 102. That is, the terminal device $E_1$ performs voice communication processing (step S4). More specifically, the wireless communications part 22 switches its function between that of a demultiplexer and that of a multiplexer. The wireless communications part 22, as a demultiplexer, demultiplexes the multiplexed signal $SL_S$ output from the antenna 21 to obtain the encoded voice signal $CSL_{S1}$, and outputs the encoded voice signal $CSL_{S1}$ to the voice decoder 23. The voice decoder 23 decodes the received encoded voice signal $CSL_{S1}$, and outputs the decoded voice signal $SL_{S1}$ to the speaker 6 via the voice switch section 5. By the processing described above, the speech of the caller is output from the speaker 6.

The voice input part 24 generates the voice signal $SL_{S2}$ representing the speech of the user, and outputs the voice signal $SL_{S2}$ to the voice encoder 25. The voice encoder 25 encodes the input voice signal $SL_{S2}$, and outputs the resultant encoded voice signal $CSL_{S2}$ to the wireless communications part 22. The wireless communications part 22, as a multiplexer, multiplexes the input encoded voice signal $CSL_{S2}$, and sends the multiplexed signal $SL_S$ to the base station 102. The processor 82 also generates the image signal $SL_I$ on the working area 83 if required, and sends the generated signal $SL_I$ to the display device 4 via the image switch section 3. By this processing, an image represented by the image signal $SL_I$ is displayed on the display device 4.

Subsequent to step S4 described above, the transport stream $ST_T$ output from the tuner 12 is stored in the content storage section 9 under control of the processor 82 (step S5). After storing of the transport stream $ST_T$, the processor 82 determines whether or not status notification $CS_{ST}$ indicating a next status change of the voice communication, that is, disconnection of the voice communication, has been received from the status detection section 7 (step S6). If not received, indicating that no restart of reception/reproduction of the content is necessary, steps S4 and S5 are executed until disconnection of the voice communication is detected. If status notification $CS_{ST}$ indicating disconnection of the voice communication has been received, this means that time $t_1$ (see FIG. 2) has been detected. Therefore, in order to restart reception/reproduction of the content, the processor 82 generates the control signal $CS_b$, and sends the signal $CS_b$ to the image switch section 3 for switching between the two input lines and the voice switch section 5 for switching between the two input lines (step S7). With this control signal $CS_b$, the image switch section 3 is set to the state ready to receive the output of the video decoder 15, and the voice switch section 5 is set to the state ready to receive the output of the audio decoder 16. Thereafter, the content reproduction section 1 outputs a video and audio constituting the content in the same manner as that in step S1 (step S8).

During the repetition of processing steps S4 and S5, the video decoder 15 and the audio decoder 16 are free from operation. Therefore, to conserve consumption of power of the terminal device $E_1$, the processor 82 may stop supplying power to these components. In this case, the processor 82 has to restart supplying power to these components in step S8.

After step S8, the processor 82 determines whether or not start instruction $SL_P$ has been received from the input device 10 (step S9). If not received, indicating that no read of the transport stream $ST_T$ from the content storage section 9 is necessary, execution of step S8 is repeated. If start instruction $SL_P$ has been received, this means that time $t_2$ (see FIG. 2) has been detected. Therefore, the processor 82 generates the control signal $CS_c$ for changing the input of the TS switch section 13 from the tuner 12 side to the control section 8 side, and sends the signal $CS_c$ to the TS switch section 13 (step S10). By this processing of step S10, the TS switch section 13 changes its input line as described above. The processor 82 then reads the transport stream $ST_T$ stored in the content storage section 9, and transfers the transport stream $ST_T$ to the TS switch section 13. The demultiplexer 14 receives the transport stream $ST_T$ transferred via the TS switch section 13, demultiplexes the transport stream $ST_T$, and outputs the resultant encoded video signal $CSL_V$ and encoded audio signal $CSL_A$ to the video decoder 15 and the audio decoder 16, respectively. The video decoder 15 and the audio decoder 16 operate in the same manner as that in step S1, reproducing the video signal $SL_V$ and the audio signal $SL_A$ from the input encoded video signal $CSL_V$ and encoded audio signal $CSL_A$, and outputting the respective signals to the display device 4 and the speaker 6. That is, the terminal device $E_1$ reads and reproduces the object content (step S11). As a result, the portion of a video constituting the object content missed by the user during the voice communication is displayed on the display device 4, and audio synchronizing with the video is output from the speaker 6. In step S11, as in step S1, the control section 8 preferably controls the relevant components to block the transport stream $ST_T$ output from the tuner 12 from being stored in the content storage section 9.

Thereafter, the processor 82 determines whether or not there is any part of the transport stream $ST_T$ which has yet to be reproduced left in the content storage section 9 (step S12). If there is, execution of step S11 is repeated. If no part of the transport stream $ST_T$ is left, meaning that the entire portion missed by the user during the voice communication has been reproduced, the processor 82 terminates the processing shown in FIG. 3.

By the processing described above, the terminal device $E_1$ stores the transport stream $ST_T$ in the content storage section 9 during voice communication. After the user finishes the voice communication and after the reception of the transport stream $ST_T$ from the broadcast station 101 is finished, the terminal device $E_1$ starts reproduction of the transport stream $ST_T$ stored in the content storage section 9 in response to the start instruction $SL_P$. In this way, it is possible to provide the terminal device $E_1$ capable of outputting a portion of a content missed by the user due to voice communication at a time shifted from the actual broadcast time.

As described above, the terminal device $E_1$ can stop storing the content in the content storage section 9 once the read from the content storage section 9 is started in step S11. Therefore, no unnecessary contents are recorded in the content storage section 9. This enables efficient use of the recording capacity of the content storage section 9.

In the embodiment described above, the status detection section 7 detects status changes of voice communication by way of the control signals $CS_M$. The terminal device $E_1$, typified by a cellular phone, is normally provided with an input device for entering the on-hook or off-hook state. Therefore, using a signal output from this input device, the status detection section 7 may detect the time point at which the telephony processing section enters the off-hook state as the first status change of the voice communication and the time point at which the telephony processing section 2 enters the on-hook state as the next status change of the voice communication.

In the embodiment described above, the telephony processing section 2 performs processing related to voice communication. Alternatively, the telephony processing section 2 may perform processing related to a videophone. In this case, the telephony processing section 2 is required to additionally perform reception/reproduction of image information on the side of the party on the other end of the voice communication, and display a video showing the party on the other end, in place of the image given by the image signal $SL_I$ described above, and also required to capture and encode image information on the side of the user.

In the embodiment described above, the content is assumed to be a TV program, but is not restricted thereto. For example, the content may be a radio program broadcast in a scheduled time frame according to a timetable made up by the radio broadcasting provider. Such a radio program is composed of audio represented by the audio signal $SL_A$. Otherwise, the content may be music, composed of a video and audio, or composed of audio only, distributed as a stream from a server via a digital network typified by the Internet. Such music is provided as the audio signal $SL_A$.

Figure 4:
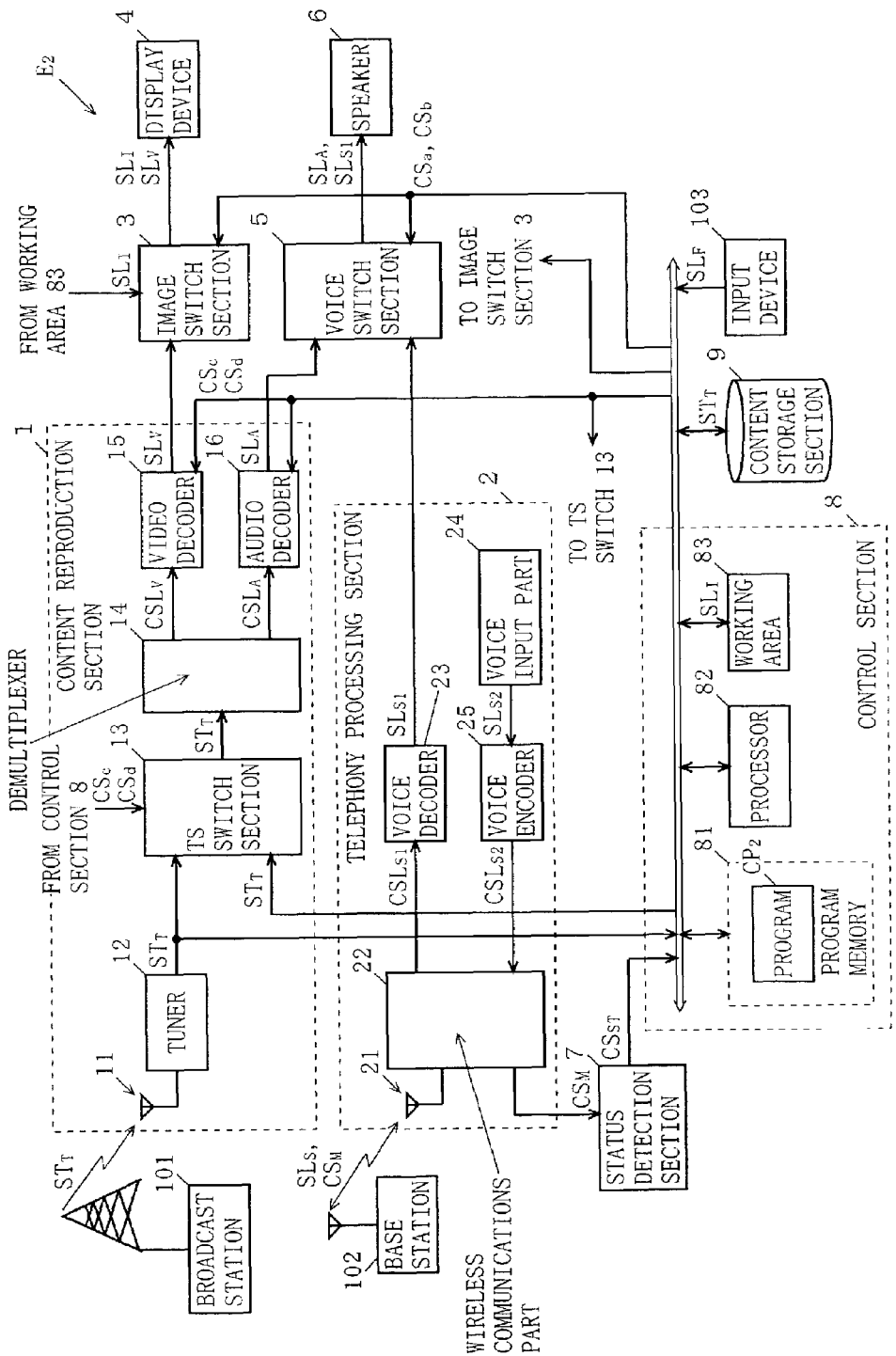
FIG. 4 is a block diagram showing the construction of a terminal device $E_2$ that is a first variant of the terminal device $E_1$ of FIG. 1.

FIG. 4 is a block diagram showing the construction of a mobile communications terminal device (hereinafter, referred to as a terminal device for simplification) $E_2$ that is a first variant of the terminal device $E_1$ described above. In FIG. 4, the terminal device $E_2$ has the same construction as the terminal device $E_1$, except that a computer program (hereinafter, referred to as a program for simplification) $CP_2$ is stored in the program memory 81 and that an input device 103 is used in place of the input device 10. Therefore, in FIG. 4, the same components as those of the terminal device $E_1$ in FIG. 1 are denoted by the same reference numerals, and the description thereof is omitted here.

The program $CP_2$ is the same in configuration as the program $CP_1$. By executing the program $CP_2$, however, the terminal device $E_2$ performs some processing items different from those performed by the terminal device $E_1$. This will be described below with reference to FIGS. 5 and 6.

The input device 103 outputs a signal $SL_F$ instructing end of reception/reproduction of the transport stream $ST_T$ (hereinafter, referred to as end instruction) in response to an input from the user.

Figure 5:
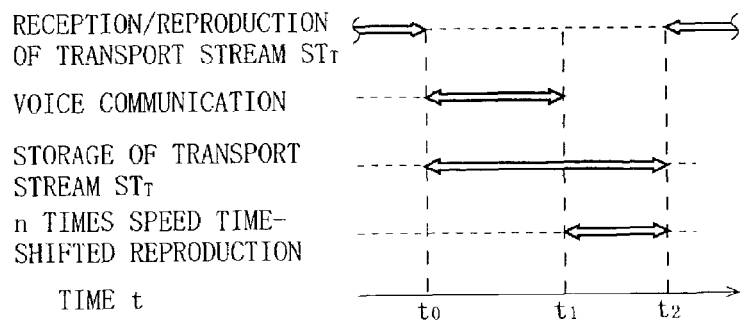
FIG. 5 is a timing chart showing an outline of an operation of the terminal device $E_2$ of FIG. 4.

Next, an operation of the terminal device $E_2$ described above is outlined with reference to FIG. 5. In FIG. 5, assuming that a call arrives when the terminal device $E_2$ receives/reproduces the transport stream $ST_T$ at time $t_0$, the user is prevented from viewing the object content from time $t_0$ until the voice communication is finished. The terminal device $E_2$ therefore stores the transport stream $ST_T$ received during the voice communication in the content storage section 9 while the user is prevented from viewing the content. Assuming that the voice communication is disconnected at time $t_1$, the terminal device $E_2$ reads the transport stream $ST_T$ stored in the content storage section 9 from time $t_1$, and reproduces the transport stream $ST_T$ at n times speed (n is a number satisfying n>1). Specifically, the portion of the object content missed by the user due to the voice communication is read sequentially from the head thereof. During this time, therefore, the user is prevented from viewing the portion of the object content being broadcast according to the actual broadcast time (portion after time $t_1$). Therefore, the terminal device $E_2$ continues storing the transport stream $ST_T$, that is, the object content being broadcast according to the actual broadcast time after time $t_1$ in the storage section 9. In this state, as n times speed time-shifted reproduction of the stored content is performed, the time lag between the content being reproduced and the content being broadcast is gradually reduced. Hence the transport stream $ST_T$ to be stored in the content storage section 9 decreases. In other words, n times speed time-shifted reproduction is performed from time $t_1$ to time $t_2$. As will be understood from the above description, by means of the n times speed time-shifted reproduction, the object content is reproduced at n times speed along a time axis different from the actual digital broadcast time.

As a result of the n times speed time-shifted reproduction, the content storage section 9 becomes substantially vacant, and thus the read of the transport stream $ST_T$ is no more possible at time $t_2$. When this time $t_2$ is detected, the terminal device $E_2$ terminates the write of the content in the content storage section 9 and the read of the content from the content storage section 9, and instead receives/reproduces the transport stream $ST_T$ being broadcast from the broadcast station 101 according to the actual broadcast time.

Figure 6:
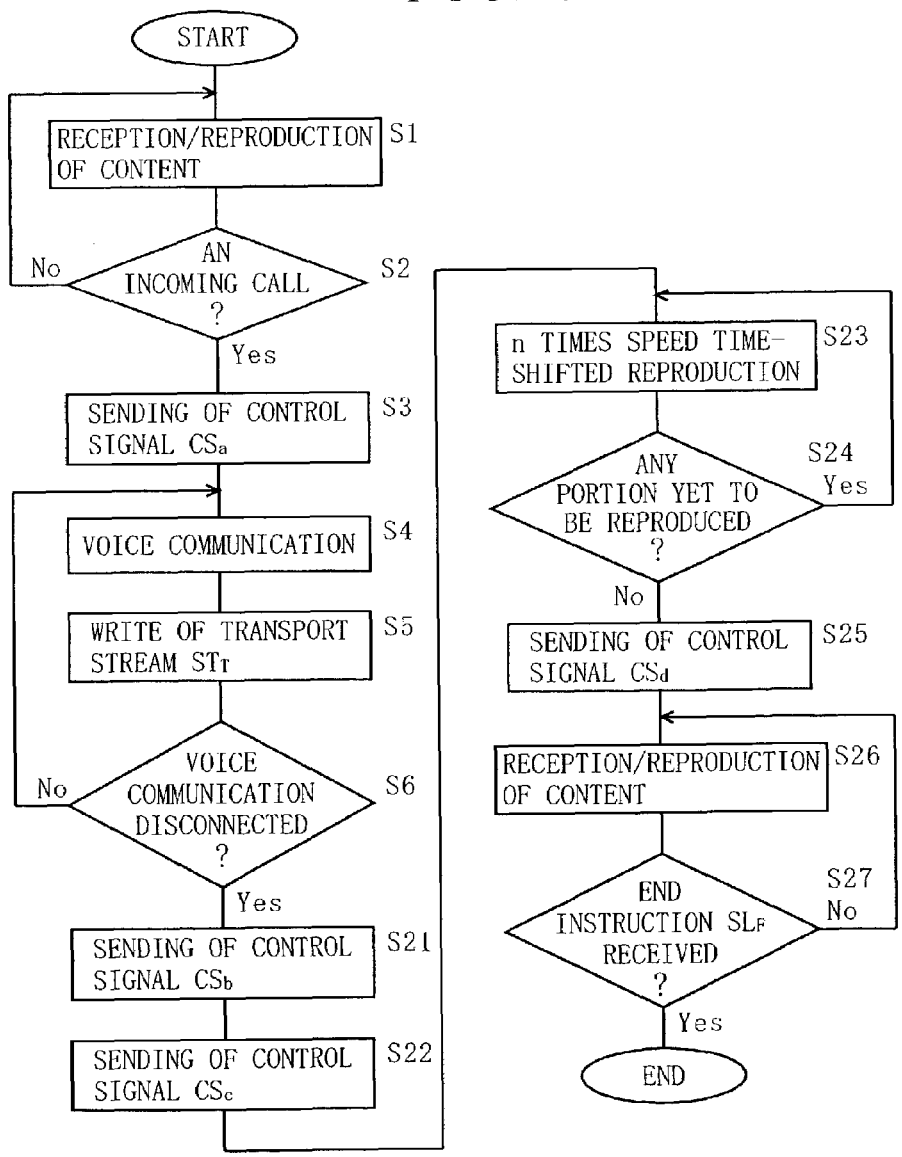
FIG. 6 is a flowchart showing a detailed operation of the terminal device $E_2$ of FIG. 4.

Referring to the flowchart of FIG. 6, the operation of the terminal device $E_2$ outlined with reference to FIG. 5 will be described in detail. The flowchart of FIG. 6 is the same as that of FIG. 3, except that steps S21 to S27 are included in place of steps S7 to S12. Therefore, in FIG. 6, the same steps as those in FIG. 3 are denoted by the same step numbers, and the description thereof is omitted here.

If the processor 82 determines that the voice communication is disconnected in step S6, this means that time $t_1$ (see FIG. 5) has been detected. Therefore, to perform the n times speed time-shifted reproduction, the processor 82 generates the control signal $CS_b$ and sends the signal to the image switch section 3 for switching between the two input lines and the voice switch section 5 for switching between the two input lines (step S21). With this control signal $CS_b$, the image switch section 3 is set to the state ready to receive the output of the video decoder 15, and the voice switch section 5 is set to the state ready to receive the output of the audio decoder 16. In addition, for the n times speed time-shifted reproduction, the processor 82 generates the control signal $CS_c$ for changing the input of the TS switch section 13 from the tuner 12 side to the control section 8 side and also instructing the video decoder 15 and the audio decoder 16 to perform the n times speed time-shifted reproduction, and sends this signal to the TS switch section 13, the video decoder 15, and the audio decoder 16 (step S22). With this control signal $CS_c$, the TS switch section 13 changes its input lines as described above, and the reproduction speed of the video decoder 15 and the audio decoder 16 is set at n times.

Thereafter, the processor 82 reads the transport stream $ST_T$ stored in the content storage section 9 and transfers the transport stream $ST_T$ to the TS switch section 13. During such read processing, the portion of the object content missed by the user due to the voice communication is sequentially read. In other words, the portion of the transport stream $ST_T$ stored during the voice communication is sequentially read from the head thereof. The demultiplexer 14 demultiplexes the transport stream $ST_T$ received via the TS switch section 13, and outputs the resultant encoded video signal $CSL_V$ and encoded audio signal $CSL_A$ to the video decoder 15 and the audio decoder 16, respectively. The video decoder 15 selects pictures required for the n times speed time-shifted reproduction from the received encoded video signal $CSL_V$, decodes the selected pictures according to MPEG, and reproduces the video signal $SL_V$. The reproduced video signal $SL_V$ is output to the display device 4 via the image switch section 3. The audio decoder 16 selects portions required for the n times speed time-shifted reproduction from the received encoded audio signal $CSL_A$, decodes the selected portions according to MPEG, and reproduces the audio signal $SL_A$. The reproduced audio signal $SL_A$ is output to the speaker 6 via the voice switch section 5. During such n times speed time-shifted reproduction, the transport stream $ST_T$ output from the tuner 12 is written in the content storage section 9 under control of the processor 82. In this way, the terminal device $E_2$ performs the n times speed time-shifted reproduction (step S23). As a result of the processing in step S23, the content missed by the user due to the voice communication is displayed from the head thereof on the display device 4 at n times speed, and audio synchronizing with the video is output from the speaker 6.

The processor 82 then determines whether or not there is any part of the transport stream $ST_T$ which has yet to be reproduced left in the content storage section 9 (step S24). If there is, execution of step S23 is repeated. If no part of the transport stream $ST_T$ is left, this means that the entire portion of the object content missed by the user due to the voice communication has been reproduced and also that time $t_2$ (see FIG. 5) has been detected. Therefore, to perform reception/reproduction of the content, the processor 82 generates a control signal $CS_d$ for changing the input lines of the TS switch section 13 from the control section 8 side to the tuner 12 side and also instructing the video decoder 15 and the audio decoder 16 to perform normal-speed reproduction, and sends this signal to the TS switch section 13, the video decoder 15, and the audio decoder 16 (step S25). With such control signal $CS_d$, the TS switch section 13 changes its input lines as described above, and the reproduction speed of the video decoder 15 and the audio decoder 16 is set at normal. Thereafter, the content reproduction section 1 reproduces the object content in the same manner as that in step S1 (step S26). The processor 82 then determines whether or not end instruction $SL_F$ has been received (step S27). If not received, it is determined that the user is still viewing the object content, and the processor 82 repeats the execution of step S26. If having received the end instruction $SL_F$, the processor 82 determines that the user has finished viewing the content and terminates the processing shown in FIG. 6.

By the processing described above, the terminal device $E_2$ writes the transport stream $ST_T$ in the content storage section 9 from the start point of the voice communication (that is, time $t_0$) till time $t_2$ as shown in FIG. 5. At the end point of the voice communication (that is, time $t_1$), the terminal device $E_2$ starts n times speed time-shifted reproduction of the portion of the object content stored in the content storage section 9 missed by the user from the head thereof. This n times speed time-shifted reproduction is performed from time $t_1$ until time $t_2$. By this processing, the amount of the transport stream $ST_T$ stored in the content storage section 9 can be reduced, and also the recording area for the transport stream $ST_T$ can be soon freed up. This enables effective use of the recording area of the content storage section 9.

In the variant described above, the video decoder 15 and the audio decoder 16 select portions required for the n times speed time-shifted reproduction, and reproduce the selected portions. Alternatively, the processor 82 may read only portions required for the n times speed time-shifted reproduction from the transport stream $ST_T$ stored in the content storage section 9, and transfer these portions to the TS switch section 13.

In the variant described above, the processor 82 determines when the n times speed time-shifted reproduction is returned to normal reproduction by examining whether or not any part of the transport stream $ST_T$ is left in the content storage section 9. Alternatively, the n times speed time-shifted reproduction may be returned to the normal reproduction when the difference between the value of a presentation time stamp (PTS) included in the transport stream $ST_T$ being written and the value of the PTS included in the transport stream $ST_T$ being read becomes substantially zero.

As another case, if portions of the object content that the user will presumably consider unnecessary (typically, commercials) are skipped and only a TV program is reproduced, the content storage section 9 will become substantially vacant. The terminal device $E_2$ may detect this time $t_2$, and then may receive/reproduce the transport stream $ST_T$ being broadcast from the broadcast station 101 according to the actual broadcast time. In this case, it is preferred not to write the portions that the user will presumably consider unnecessary in the content storage section 9. This can reduce the storage area occupied by the object content in the content storage section 9.

Figure 7:
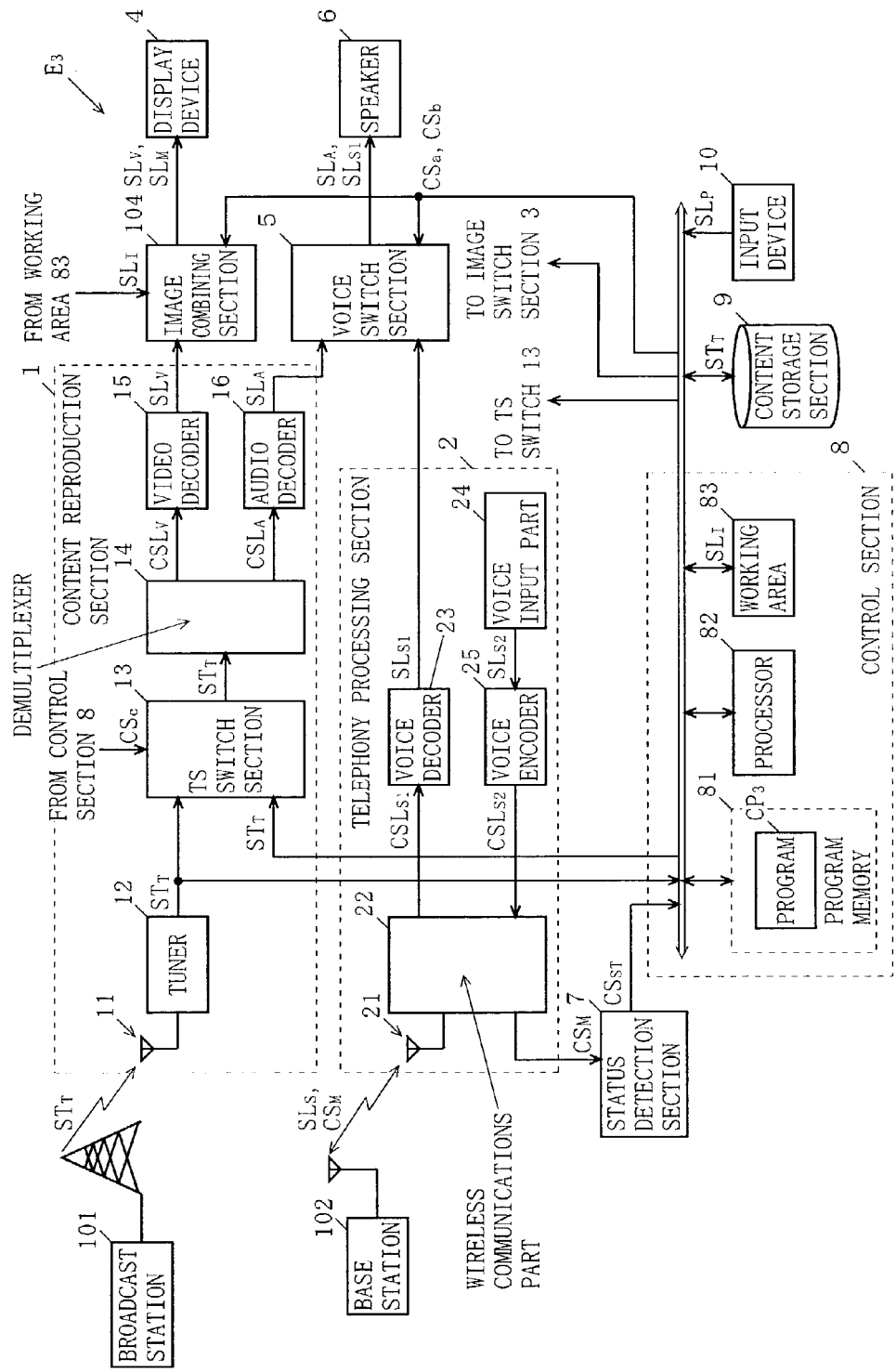
FIG. 7 is a block diagram showing the construction of a terminal device $E_3$ that is a second variant of the terminal device $E_1$ of FIG. 1.

FIG. 7 is a block diagram showing the construction of a mobile communications terminal device (hereinafter, referred to as a terminal device for simplification) $E_3$ that is a second variant of the terminal device $E_1$ described above. In FIG. 7, the terminal device $E_3$ has the same construction as the terminal device $E_1$, except that a computer program (hereinafter, referred to as a program for simplification) $CP_3$ is stored in the program memory 81 and that an image combining section 104 is provided in place of the image switch section 3. In FIG. 7, the same components as those of the terminal device $E_1$ in FIG. 1 are denoted by the same reference numerals, and the description thereof is omitted here.

The program $CP_3$ is the same in configuration as the program $CP_1$. By executing the program $CP_3$, however, the terminal device $E_3$ performs some processing items different from those performed by the terminal device $E_1$. This will be described below with reference to FIGS. 8 and 9.

During voice communication, the image combining section 104 receives the video signal $SL_V$ from the video decoder 15 and the image signal $SL_I$ generated by the control section 8. The image combining section 104 combines the input video signal $SL_V$ and the input image signal $SL_I$ for generating a combined image signal $SL_M$, and outputs the combined signal to the display device 4. During reception/reproduction of the transport stream $ST_T$, the image combining section 104 outputs the video signal $SL_V$ from the video decoder 15 to the display device 4 as it is.

Figure 8:
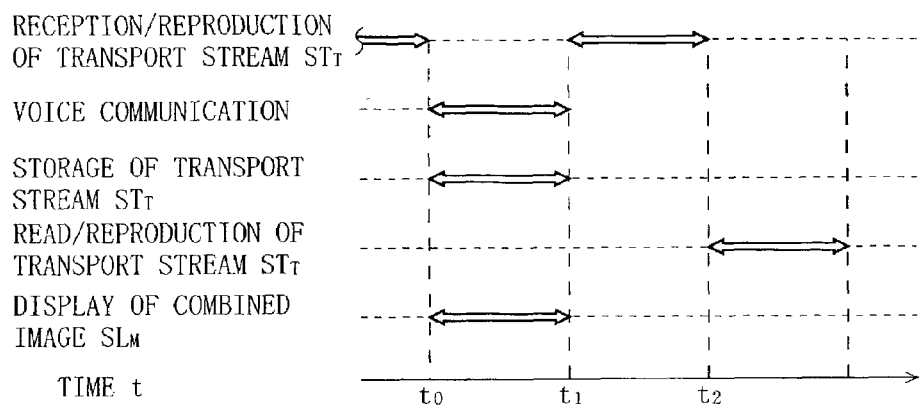
FIG. 8 is a timing chart showing an outline of an operation of the terminal device $E_3$ of FIG. 7.

Next, an operation of the terminal device $E_3$ described above is outlined with reference to FIG. 8. In FIG. 8, assume that a call arrives when the terminal device $E_3$ receives/reproduces the transport stream $ST_T$ at time $t_0$ and that the voice communication is disconnected at time $t_1$. In the embodiment and the variant described above, the user is prevented from viewing the object content during the time period from $t_0$ to $t_1$. In this variant, however, the terminal device $E_3$ generates the combined image $SL_M$ as described above, and displays this image during the time period from $t_0$ to $t_1$. By displaying this image, the user can view the object content during the voice communication. In this way, the terminal device $E_3$ can provide more enhanced operability.

Figure 9:
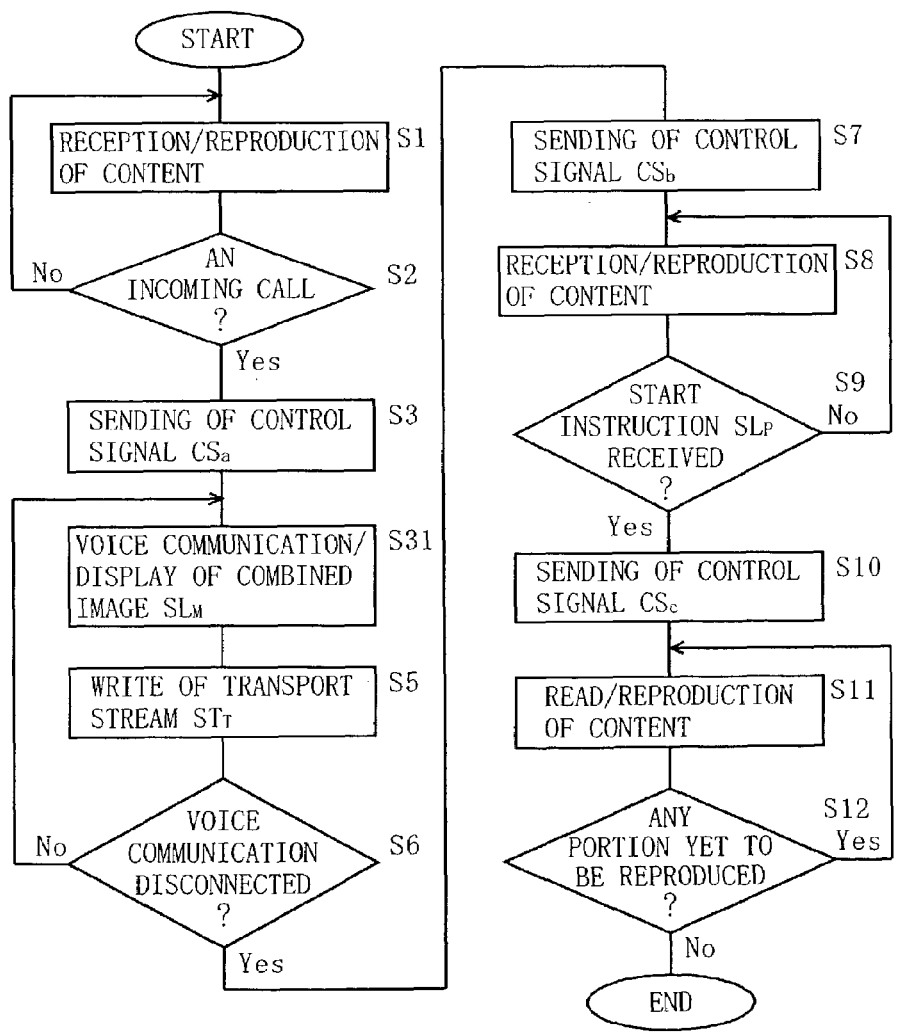
FIG. 9 is a flowchart showing a detailed operation of the terminal device $E_3$ of FIG. 7.

Referring to the flowchart of FIG. 9, the operation of the terminal device $E_3$ outlined with reference to FIG. 8 will be described in more detail. The flowchart of FIG. 9 is the same as that in FIG. 3, except that step S31 is included in place of step S4. Therefore, in FIG. 9, the same steps as those in FIG. 3 are denoted by the same step numbers, and the description thereof is omitted here.

If the status notification $CS_{ST}$ indicating an incoming call has been received in step S2, the processor 82 starts execution of the program for voice communication processing included in the program $CP_3$. The terminal device $E_3$ then performs processing required for voice communication, and also generates and displays the combined image $SL_M$ (step S31). The processing required for voice communication is the same as that performed in the embodiment described above. In this variant, therefore, only the generation/display of the combined image $SL_M$ will be described in detail. The processor 82 generates the image signal $SL_I$ on the working area 83 if required, and sends the signal to the image combining section 104. The video signal $SL_V$ is also sent to the image combining section 104 from the video decoder 15 as described above. The image combining section 104 combines the input image signal $SL_I$ and the input video signal $SL_V$ for generating the combined image signal $SL_M$ in which a video of the broadcast content is superimposed on the image used during voice communication. The display device 4, receiving the combined image signal $SL_M$ and performing necessary display processing for the received signal, displays the image represented by the image signal $SL_I$ and a video of the object content. By the processing described above, the terminal device $E_3$ can output the object content even during voice communication.

Although the terminal device $E_3$ has been described as a variant of the terminal device $E_1$, it may be a variant of the terminal device $E_2$. That is, step S31 described above may be executed in place of step S4 in FIG. 6.

Figure 10:
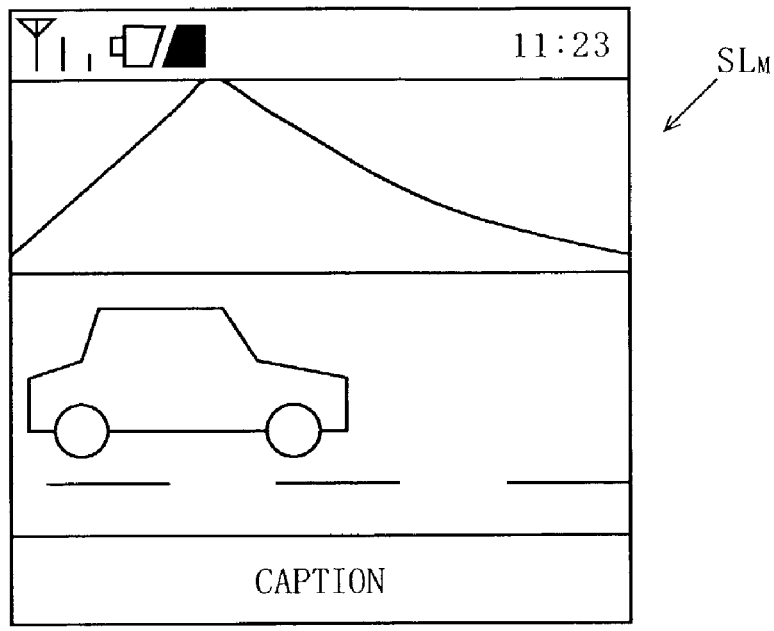
FIG. 10 is a view showing a first example of a combined image signal $SL_M$ generated by an image combining section 104 in FIG. 7.
Figure 11:
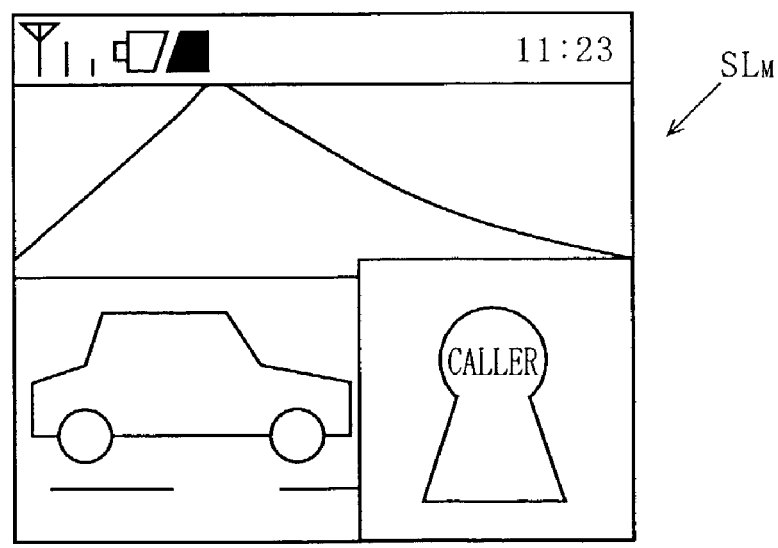
FIG. 11 is a view showing a second example of the combined image signal $SL_M$ generated by the image combining section 104 in FIG. 7.
Figure 12:
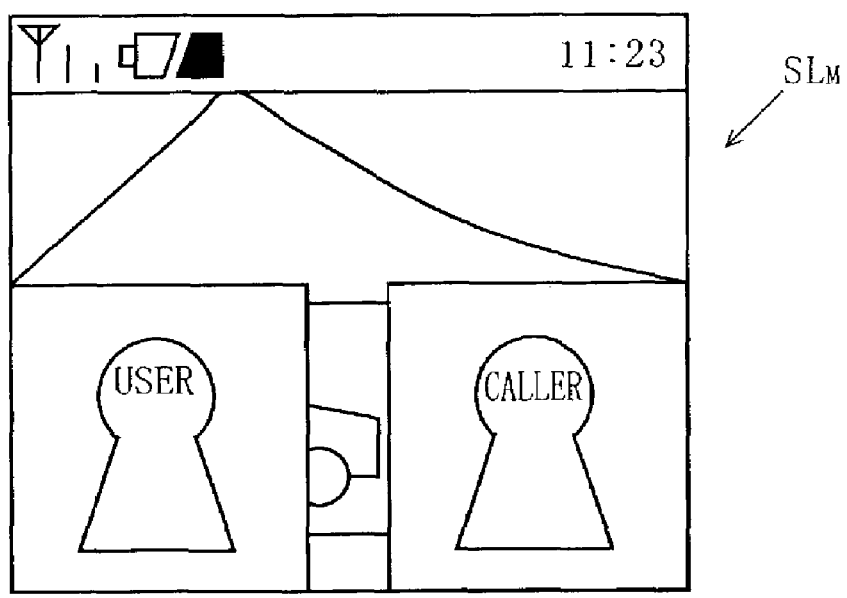
FIG. 12 is a view showing a third example of the combined image signal $SL_M$ generated by the image combining section 104 in FIG. 7.

In the variant described above, the combined signal $SL_M$ was obtained by combining the object content and the image to be displayed during voice communication. Alternatively, if the transport stream $ST_T$ includes multiplexed text data representing in characters what is expressed by the voice constituting the content, that is, caption data, the image combining section 104 may generate the combined image signal $SL_M$ additionally including the caption as shown in FIG. 10. If the telephony processing section 2 performs processing required for a videophone, the image combining section 104 may generate the combined image signal $SL_M$ additionally including an image of the party on the other end of voice communication as shown in FIG. 11. The image combining section 104 may also generate the combined image signal $SL_M$ further additionally including an image of the user as shown in FIG. 12.

Figure 13:
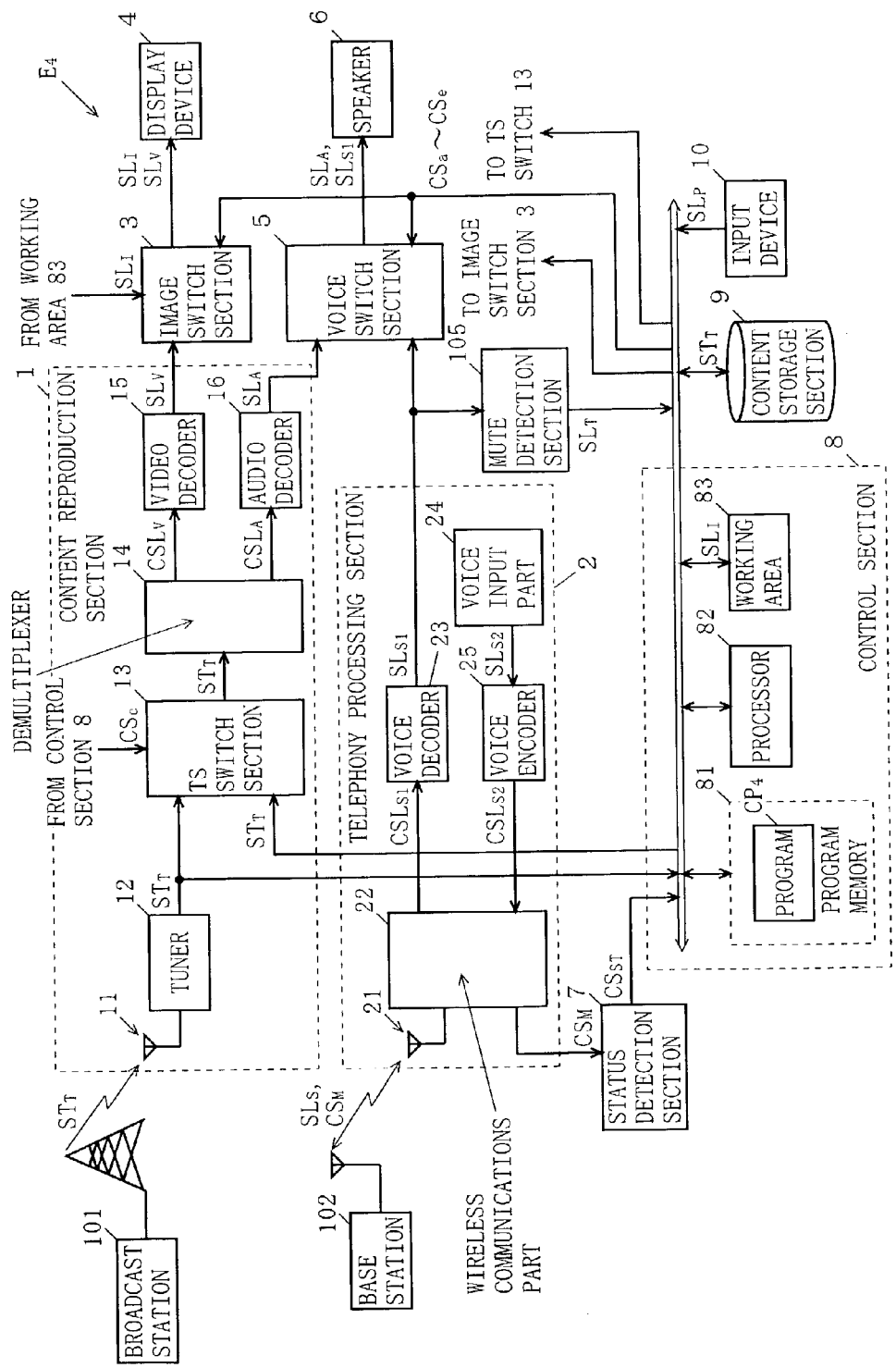
FIG. 13 is a block diagram showing the construction of a terminal device $E_4$ that is a third variant of the terminal device $E_1$ of FIG. 1.

FIG. 13 is a block diagram showing the construction of a mobile communications terminal device (hereinafter, referred to as a terminal device for simplification) $E_4$ that is a third variant of the terminal device $E_1$ described above. In FIG. 13, the terminal device $E_4$ has the same construction as the terminal device $E_1$, except that a computer program (hereinafter, referred to as a program for simplification) $CP_4$ is stored in the program memory 81 and that a mute detection section 105 is additionally included. In FIG. 13, the same components as those of the terminal device $E_1$ in FIG. 1 are denoted by the same reference numerals, and the description thereof is omitted here.

The program $CP_4$ is the same in configuration as the program $CP_1$. By executing the program $CP_4$, however, the terminal device $E_4$ performs some processing items different from those performed by the terminal device $E_1$. This will be described below in detail with reference to FIGS. 14 and 15.

The mute detection section 105 receives the voice signal $SL_{S1}$ output from the voice decoder 23. The mute detection section 105 typically detects a mute time period $B_{NS}$ during which the party on the other end of voice communication does not speak based on the amplitude value of the input voice signal $SL_{S1}$, generates a timing signal $SL_T$ indicating a start or end point of the mute time period, and outputs the timing signal to the control section 8.

Next, an operation of the terminal device $E_4$ described above is outlined with reference to FIG. 14. In FIG. 14, assume that times $t_0$ and $t_1$ are defined as described above. The user is prevented from hearing audio constituting the object content during the time period from $t_0$ to $t_1$ in the embodiment described above. In this variant, however, the terminal device $E_4$ detects the mute time period $B_{NS}$ during which the party on the other end of voice communication does not speak based on the voice signal $SL_{S1}$, and controls the input line of the voice switch section 5 so that the audio signal $SL_A$ from the audio decoder 16 is input into the speaker 6 during the detected mute time period $B_{NS}$. By this processing, the user can hear the audio of the object content during the voice communication if it is in the mute time period $B_{NS}$. In this way, the terminal device $E_4$ can provide more enhanced operability.

Figure 15:
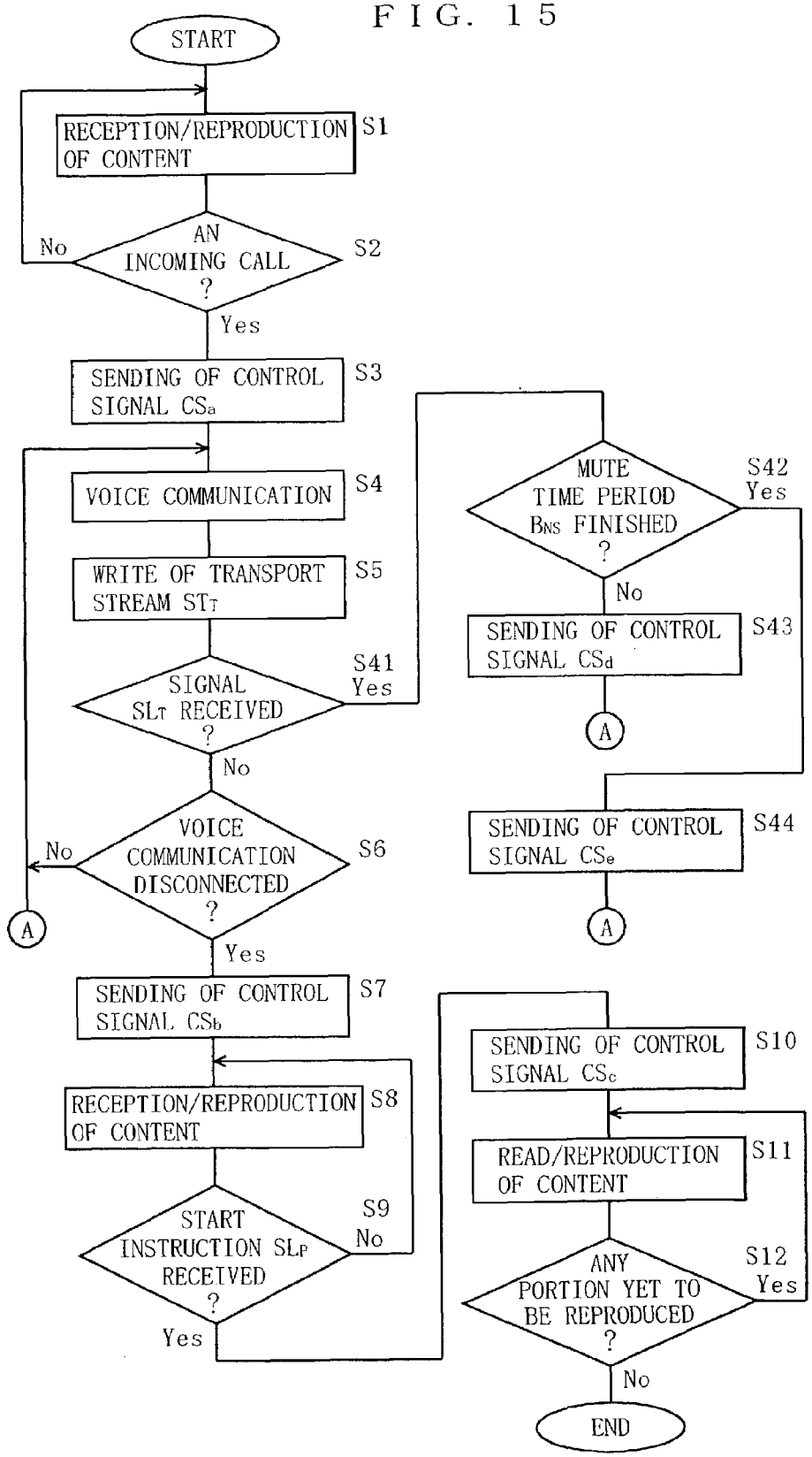
FIG. 15 is a flowchart showing a detailed operation of the terminal device $E_4$ of FIG. 13.

The operation of the terminal device $E_4$ outlined above is described in more detail with reference to the flowchart of FIG. 15. The flowchart of FIG. 15 is the same as that of FIG. 3, except that steps S41 to S44 are additionally included. Therefore, in FIG. 15, the same steps as those in FIG. 3 are denoted by the same step numbers, and the description thereof is omitted here.

After step S5, the processor 82 determines whether or not the timing signal $SL_T$ has been received from the mute detection section 105 (step S41). If not received, the processing proceeds to step S6 because no switching of the voice switch section 5 is required. If the timing signal $SL_T$ has been received, the processor 82 determines whether or not the signal indicates the end point of a mute time period $B_{NS}$ (step S42). If not, this means that the received timing signal $SL_T$ indicates the start point of the mute time period $B_{NS}$. Therefore, the processor 82 generates a control signal $CS_d$ for changing the input line of the voice switch section 5 from the voice decoder 23 to the audio decoder 16, and outputs the generated control signal to the voice switch section 5 (step S43). On the other hand, if the timing signal $SL_T$ indicating the end point of the mute time period $B_{NS}$ has been received in step S42, the processor 82 generates a control signal $CS_e$ for changing the input line of the voice switch section 5 from the audio decoder 16 to the voice decoder 23, and outputs the generated control signal to the voice switch section 5 (step S44). Once the processing of step S43 or S44 described above is finished, the processor 82 executes step S4 again. By the processing described above, the terminal device $E_4$ can output audio constituting the object content during voice communication if it is in the mute time period $B_{NS}$.

Although the terminal device $E_4$ was described as a variant of the terminal device $E_1$, it may be a variant of the terminal device $E_2$ or $E_3$. That is, steps S41 to S44 described above may be incorporated in the flowchart of FIG. 6 or 9.

Figure 16:
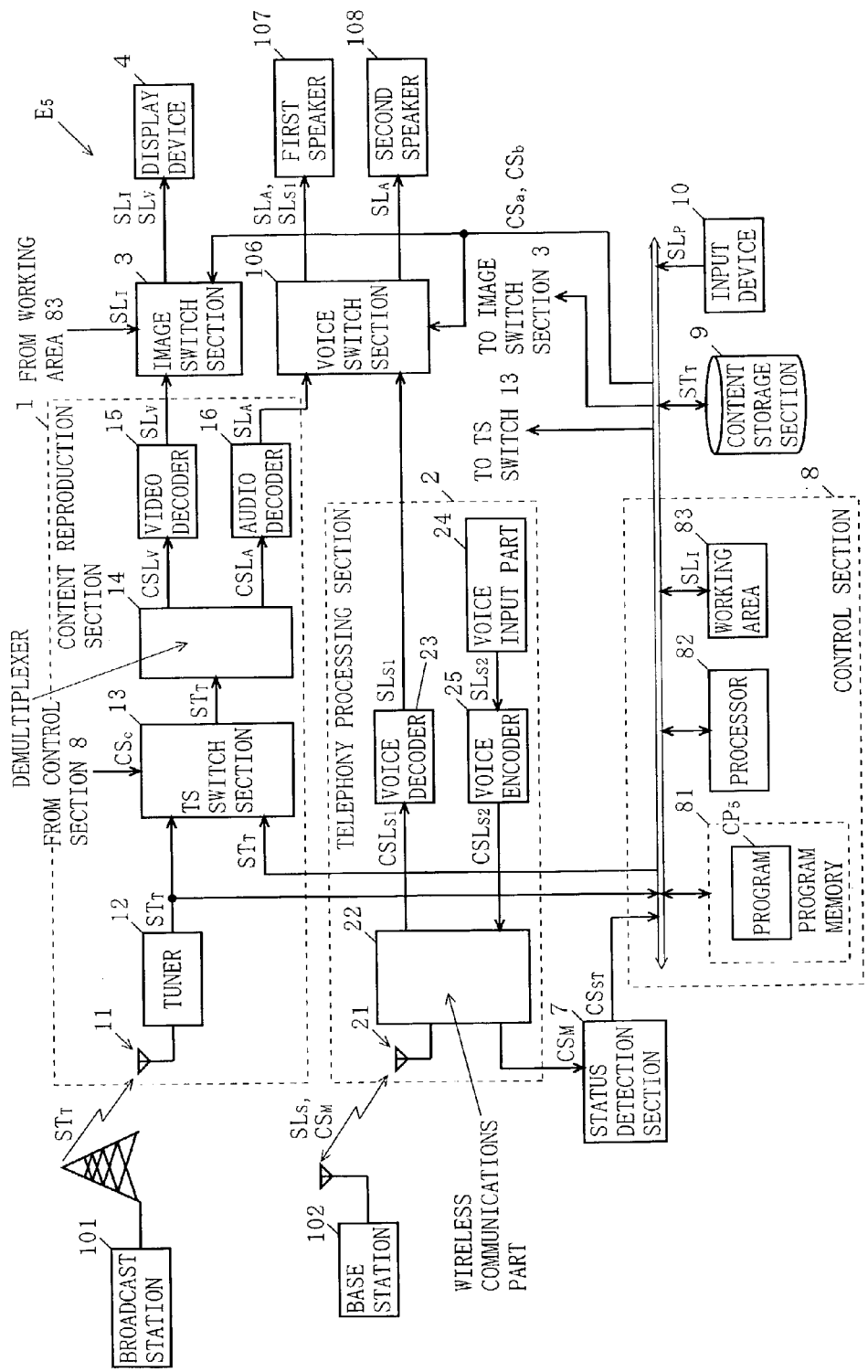
FIG. 16 is a block diagram showing the construction of a terminal device $E_5$ that is a fourth variant of the terminal device $E_1$ of FIG. 1.

FIG. 16 is a block diagram showing the construction of a mobile communications terminal device (hereinafter, referred to as a terminal device for simplification) $E_5$ as a fourth variant of the terminal device $E_1$ described above. In FIG. 16, the terminal device $E_5$ has the same construction as the terminal device $E_1$, except that a computer program (hereinafter, referred to as a program for simplification) $CP_5$ is stored in the program memory 81 and that a voice switch section 106 and first and second speakers 107 and 108 are provided in place of the voice switch section 5 and the speaker 6. In FIG. 16, therefore, the same components as those of the terminal device $E_1$ in FIG. 1 are denoted by the same reference numerals, and the description thereof is omitted here.

The program $CP_5$ is the same in configuration as the program $CP_1$. By executing the program $CP_5$, however, the terminal device $E_5$ performs some processing items different from those performed by the terminal device $E_1$. This will be described below in detail with reference to FIGS. 17 and 18.

The voice switch section 106 receives the audio signal $SL_A$ output from the audio decoder 16 and the voice signal $SL_{S1}$, output from the voice decoder 23. During reception/reproduction of the transport stream $ST_T$, the voice switch section 106 outputs the input audio signal $SL_A$ to the first and second speakers 107 and 108. However, during voice communication, the voice switch section 106 outputs the input audio signal $SL_A$ to one of the first and second speakers 107 and 108 (the second speaker 108 in FIG. 16), and outputs the input voice signal $SL_{S1}$ to the other speaker 107 or 108 (the first speaker 107 in FIG. 16). The voice switch section 106 switches its input/output lines in accordance with the control signal $CS_a$ or $CS_b$ output from the control section 8.

The first and second speakers 107 and 108 are L-side and R-side speakers, respectively, for stereo output.

Figure 17:
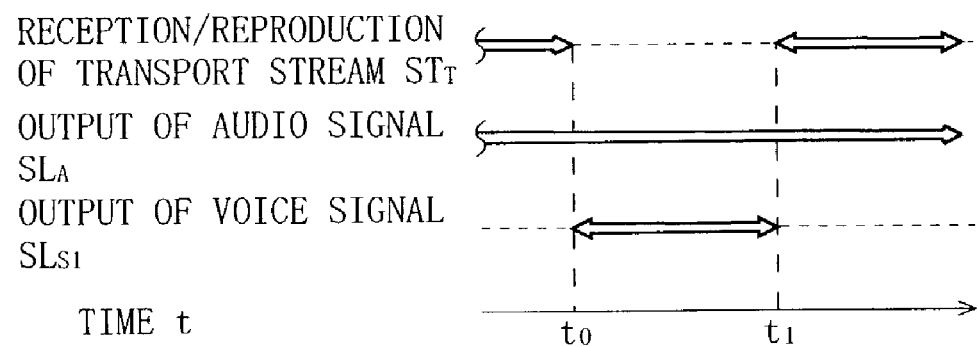
FIG. 17 is a timing chart showing an outline of an operation of the terminal device $E_5$ of FIG. 16.

Next, an operation of the terminal device $E_5$ described above is outlined with reference to FIG. 17. The user is prevented from hearing audio constituting the object content during the time period from to $t_0$ $t_1$ in the embodiment described above. In this variant, however, as shown in FIG. 17, the terminal device $E_5$ controls the voice switch section 106 so that the voice signal $SL_{S1}$ received from the voice decoder 23 is output from the first speaker 107 and the audio signal $SL_A$ received from the audio decoder 16 is output from the second speaker 108. By this processing, the user can hear the audio of the object content even during voice communication. In this way, the terminal device $E_5$ can provide more enhanced operability.

Figure 18:
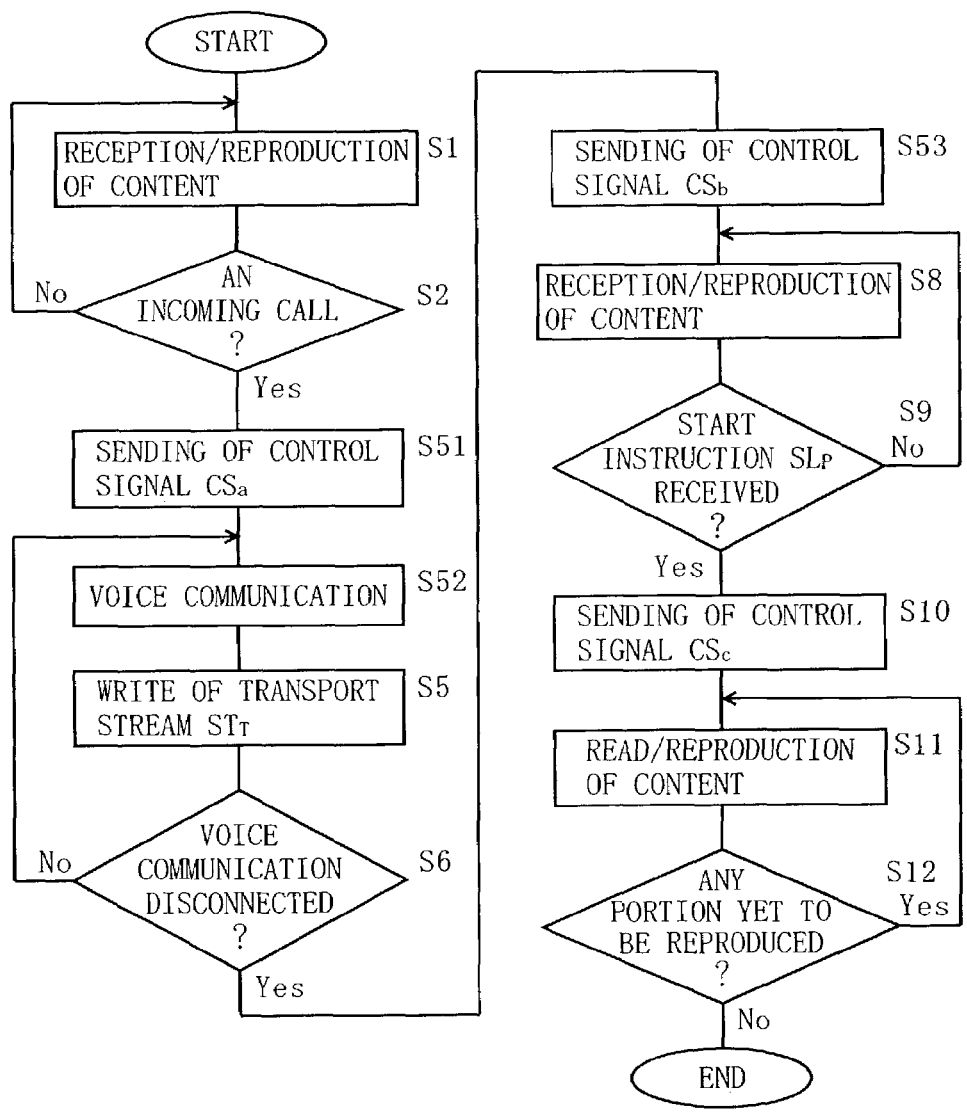
FIG. 18 is a flowchart showing a detailed operation of the terminal device $E_5$ of FIG. 16.

The operation of the terminal device $E_5$ outlined above will be described in detail with reference to the flowchart of FIG. 18. The flowchart of FIG. 18 is the same as that of FIG. 3, except that steps S51 to S53 are included in place of steps S3, S4 and S7. Therefore, in FIG. 18, the same steps as those in FIG. 3 are denoted by the same step numbers, and the description thereof is omitted here.

If status notification $CS_{ST}$ indicating an incoming call has been received in step S2, the processor 82 generates the control signal $CS_a$, and sends the signal to the image switch section 3 for switching between the two input lines and the voice switch section 5 for switching between the two input lines (step S51). As a result, the image switch section 3 is set to the state ready to receive the output of the control section 8, and the voice switch section 5 is set to the state ready to receive both the outputs of the audio decoder 16 and the voice decoder 23.

The processor 82 then starts execution of the program for voice communication processing included in the program $CP_5$. The terminal device $E_5$ exchanges the multiplexed signal $SL_S$ with the base station 102 for voice communication, demultiplexes the encoded voice signal $CSL_{S1}$ included in the multiplexed signal to reproduce the voice signal $SL_{S1}$, and thus outputs the speech of the caller. The terminal device $E_5$ also generates the encoded voice signal $CSL_{S2}$ representing the speech of the user, multiplexes the encoded voice signal, and sends the resultant multiplexed signal $SL_S$ to the base station 102 (step S52). More specifically, the wireless communications part 22 switches its function between that of a demultiplexer and that of a multiplexer. The wireless communications part 22, as a demultiplexer, demultiplexes the multiplexed signal $SL_S$ input from the antenna 21 to obtain the encoded voice signal $CSL_{S1}$, and outputs the encoded voice signal to the voice decoder 23. The voice decoder 23 decodes the input encoded voice signal $CSL_{S1}$, and outputs the decoded voice signal $SL_{S1}$, to one of the first and second speakers 107 and 108 via the voice switch section 106. At the same time, the audio decoder 16 outputs the reproduced audio signal $SL_A$ to the other speaker 107 or 108 via the voice switch section 106. By the processing described above, the speech of the caller and the audio of the content are output from the speakers 107 and 108.

The voice encoder 25 encodes the voice signal $SL_{S2}$ from the voice input part 24, and outputs the encoded voice signal $CSL_{S2}$ to the wireless communications part 22. The wireless communications part 22, as a multiplexer, multiplexes the input encoded voice signal $CSL_{S2}$ and sends the resultant multiplexed signal $SL_S$ to the base station 102 via the antenna 21.

The processor 82 generates the image signal $SL_I$ on the working area 83 if required, and sends the signal to the display device 4 via the image switch section 3. By this processing, an image represented by the image signal $SL_I$ is displayed on the display device 4.

If it is determined that the voice communication has been disconnected in step S6, the processor 82 generates the control signal $CS_b$ and sends the signal to both the image switch section 3 and the voice switch section 106 for switching the input lines (step S53). As a result, the image switch section 3 is set to the state ready to receive the output of the video decoder 15, and the voice switch section 106 is set to the state ready to receive the output of the audio decoder 16. By the processing described above, the operation outlined with reference to FIG. 17 is obtained. That is, the terminal device $E_5$ can output audio constituting the object content even during voice communication.

Although the terminal device $E_5$ has been described as a variant of the terminal device $E_1$, it may be a variant of the terminal device $E_2$ or $E_3$. That is, steps S51 to S53 described above may be incorporated in the flowchart of FIG. 6 or 9.

Figure 19:
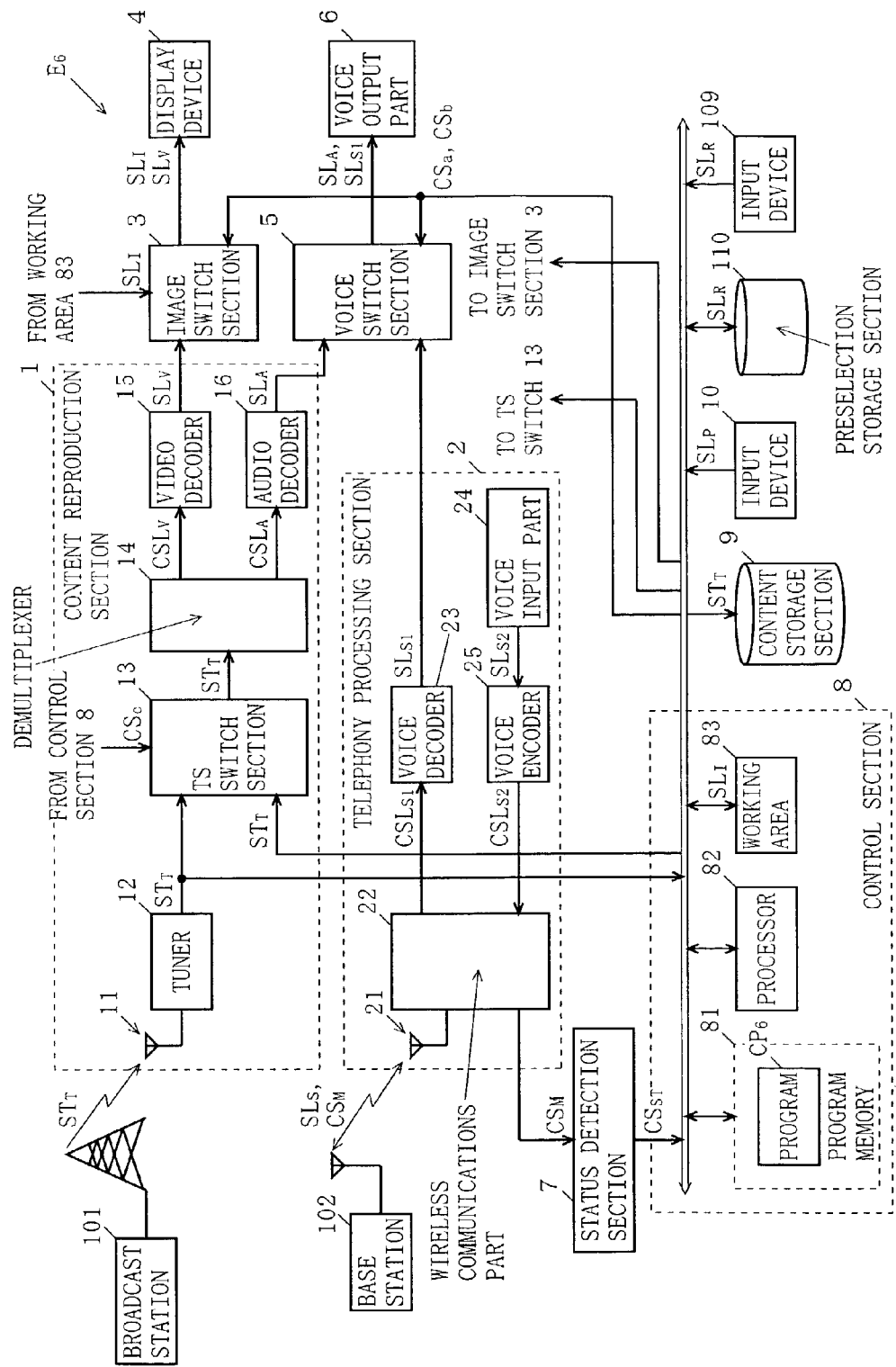
FIG. 19 is a block diagram showing the construction of a terminal device $E_6$ that is a fifth variant of the terminal device $E_1$ of FIG. 1.

FIG. 19 is a block diagram showing the construction of a mobile communications terminal device (hereinafter, referred to as a terminal device for simplification) $E_6$ as a fifth variant of the terminal device $E_1$ described above. In FIG. 19, the terminal device $E_6$ has the same construction as the terminal device $E_1$, except that a computer program (hereinafter, referred to as a program for simplification) $CP_6$ is stored in the program memory 81 and that an input device 109 and a preselection storage section 110 are additionally provided. In FIG. 19, therefore, the same components as those of the terminal device $E_1$ in FIG. 1 are denoted by the same reference numerals, and the description thereof is omitted here.

The program $CP_6$ is the same in configuration as the program $CP_1$. By executing the program $CP_6$, however, the terminal device $E_6$ performs some processing items different from those performed by the terminal device $E_1$. This will be described below with reference to FIGS. 20 and 21.

The input device 109 outputs a signal $SL_R$ indicating the channel and the broadcast start time of a content the user wants to view in the future (hereinafter, referred to as preselection information) to the control section 8 in response to the input from the user.

Figure 20:
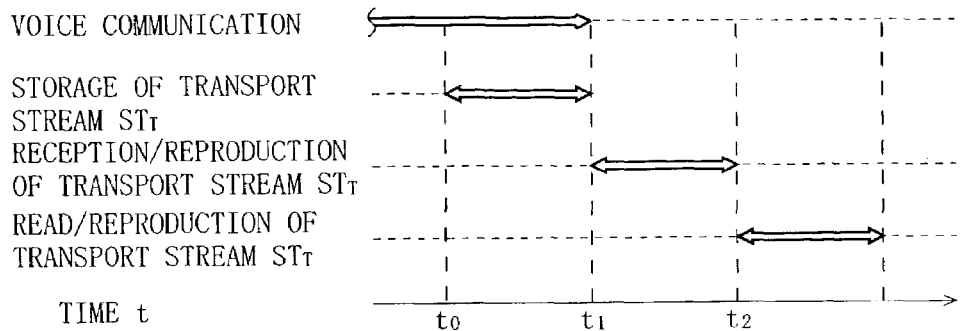
FIG. 20 is a timing chart showing an outline of an operation of the terminal device $E_6$ of FIG. 19.

Next, an operation of the terminal device $E_6$ described above is outlined with reference to FIG. 20. Preselection information $SL_R$ generated according to the user's input with the input device 109 is stored in the preselection storage section 110 of the terminal device $E_6$. In FIG. 20, assume that the user is still engaged in voice communication using the terminal device $E_6$ when broadcast of a content specified by the preselection information $SL_R$ (hereinafter, referred to as an object content) starts at time $t_0$. The user is prevented from viewing the object content from time $t_0$ until the voice communication is finished. Note that the content as used in this variant has the same definition as that described in the above embodiment. During the time period for which the user misses the content, the terminal device $E_6$ stores the received transport stream $ST_T$ in the content storage section 9. Assuming that the voice communication is finished and disconnected at time $t_1$, the terminal device $E_6$ reproduces the received transport stream $ST_T$ at time $t_2$ that is after time $t_1$. In this way, the user can view the portion of the content broadcast during the voice communication.

Figure 21:
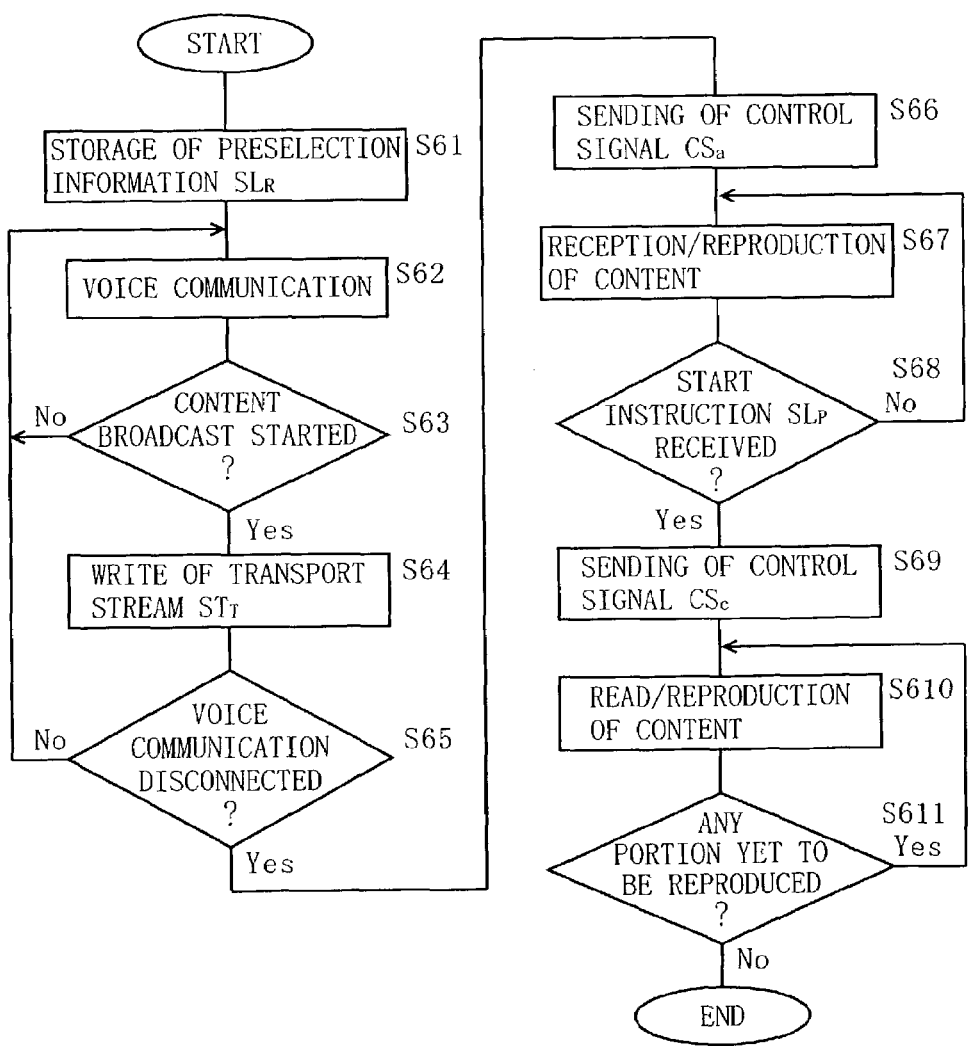
FIG. 21 is a flowchart showing a detailed operation of the terminal device $E_6$ of FIG. 19.

The operation outlined above with reference to FIG. 20 is described in detail with reference to the flowchart of FIG. 21. In FIG. 21, the user inputs the channel and the broadcast start time of the object content with the input device 109 of the terminal device $E_6$. In response to this input, the input device 109 generates preselection information $SL_R$ indicating the input information. The generated preselection information $SL_R$ is stored in the preselection storage section 110 (step S61).

When a control signal $CS_M$ indicating an incoming call is received by the voice communication processing unit 2, the processor 82 receives the status notification $CS_{ST}$ from the status detection section 7 and, in response to this notification, executes the program for voice communication processing included in the program $CP_6$. That is, the image switch section 3 is set to the state ready to receive the output of the control section 8, and the voice switch section 5 is set to the state ready to receive the output of the voice decoder 23. The terminal device $E_6$ then exchanges the multiplexed signal $SL_S$ with the base station 102 for voice communication as in step S4 described above (step S62).

Thereafter, the processor 62 accesses the preselection storage section 110 and determines whether or not the time of broadcast of the object content designated by the preselection information $SL_R$ has come (step S63). If not, indicating that write of the transport stream $ST_T$ is unnecessary, execution of step S62 is repeated. If the time of the start of the object program has come, the tuner 12 is set to receive the preselected channel under the control of the processor 82, and the processor 82 writes the transport stream $ST_T$ output from the tuner 12 in the content storage section 9, as in step S5 described above (step S64). Subsequent to the write operation, the processor 82 determines whether or not the status notification $CS_{ST}$ indicating disconnection of the voice communication has been received (step S65). If not received, indicating that reproduction of the transport stream $ST_T$ stored in the content storage section 9 is unnecessary, execution of step S62 is repeated. If the status notification $CS_{ST}$ indicating disconnection of the voice communication has been received, the processor 82 performs necessary processing in response to this notification and then terminates the write of the content in the content storage section 9. At the same time, the processor 82 generates the control signal $CS_a$ and sends the signal to the image switch section 3 for switching between the two input lines and the voice switch section 5 for switching between the two input lines (step S66).

As a result of the switching of the input lines in step S66, a video composing of the object content is displayed on the display device 4, and audio synchronizing with the video is output from the speaker 6, as in step S1 described above (step S67). Thereafter, the processor 82 determines whether or not the start instruction $SL_P$ has been received from the input device 10 (step S68). If not received, indicating that read of the transport stream $ST_T$ from the content storage section 9 is unnecessary, execution of step S67 is repeated. If the start instruction $SL_P$ has been received, the processor 82 generates the control signal $CS_c$ for changing the input of the TS switch section 13 from the tuner 12 side to the control section 8 side, and sends the signal to the TS switch section 13 (step S69). By this step S69, the TS switch section 13 changes the input accordingly.

The processor 82 reads the transport stream $ST_T$ stored in the content storage section 9 and transfers the transport stream to the TS switch section 13. The demultiplexer 14 demultiplexes the transport stream $ST_T$ transferred via the TS switch section 13, and outputs the resultant encoded video signal $CSL_V$ and encoded audio signal $CSL_A$ to the video decoder 15 and the audio decoder 16, respectively. The video decoder 15 and the audio decoder 16 operate as in step S1 for reproducing the video signal $SL_V$ and the audio signal $SL_A$ (step S610). As a result, a video constituting the object content missed by the user during the voice communication is displayed on the display device 4, and audio synchronizing with the video is output from the speaker 6.

As in step S11, the processor 82 determines whether or not there is any part of the transport stream $ST_T$ which has yet to be reproduced left in the content storage section 9 (step S611). If there is, execution of step S610 is repeated. If no part of the transport stream $ST_T$ is left, this means that the user has viewed all the portion of the content missed due to the voice communication. Therefore, the processor 82 terminates the processing shown in FIG. 21.

By the processing described above, the operation outlined with reference to FIG. 20 is obtained. That is, during voice communication, the terminal device $E_6$ writes the transport stream $ST_T$ in the content storage section 9 once broadcast of the object program is started. After the voice communication is finished and after the reception of the transport stream $ST_T$ from the broadcast station 101 is finished, reproduction of the transport stream $ST_T$ stored in the content storage section 9 is started. In this way, it is possible to provide a communications terminal device capable of outputting the portion of the content missed by the user due to the voice communication at a time shifted from the actual broadcast time.

Although the terminal device $E_6$ was described as a variant of the terminal device $E_1$, it may be a variant of any of the terminals $E_2$ to $E_5$. Otherwise, the terminal device $E_6$ may be combined with any of the terminals $E_1$ to $E_5$.

Figure 22:
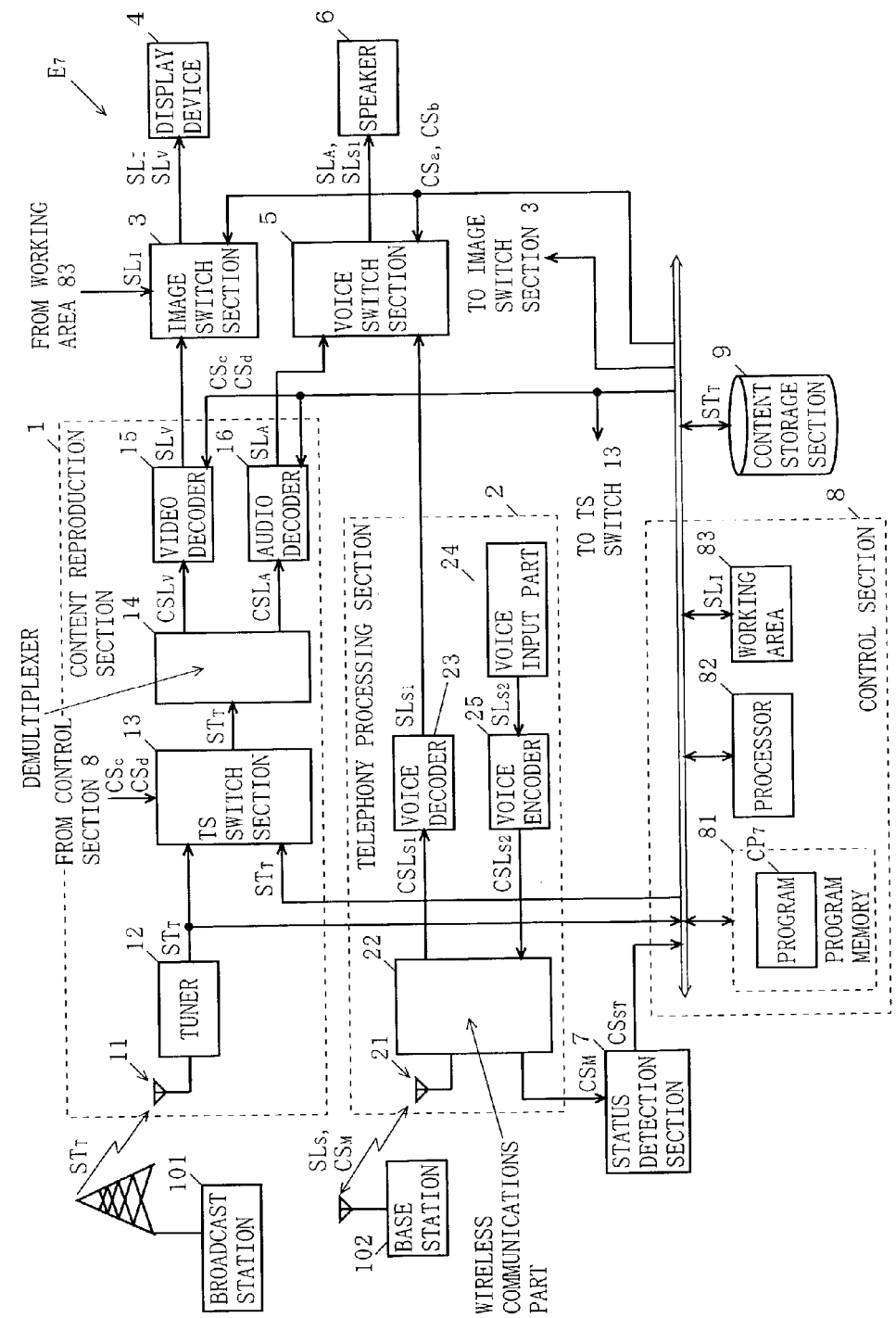
FIG. 22 is a block diagram showing the construction of a terminal device $E_7$ that is a sixth variant of the terminal device $E_1$ of FIG. 1.

FIG. 22 is a block diagram showing the construction of a mobile communications terminal device (hereinafter, referred to as a terminal device for simplification) $E_7$ as a sixth variant of the terminal device $E_1$ described above. In FIG. 22, the terminal device $E_7$ has the same construction as the terminal device $E_1$, except that a computer program (hereinafter, referred to as a program for simplification) $CP_7$ is stored in the program memory 81 and that the input device 10 is unnecessary. In FIG. 22, therefore, the same components as those of the terminal device $E_1$ in FIG. 1 are denoted by the same reference numerals, and the description thereof is omitted here.

The program $CP_7$ is the same in configuration as the program $CP_1$. By executing the program $CP_7$, the terminal device $E_7$ performs some processing items different from those performed by the terminal device $E_1$. This will be described below with reference to FIGS. 23 and 24.

Figure 23:
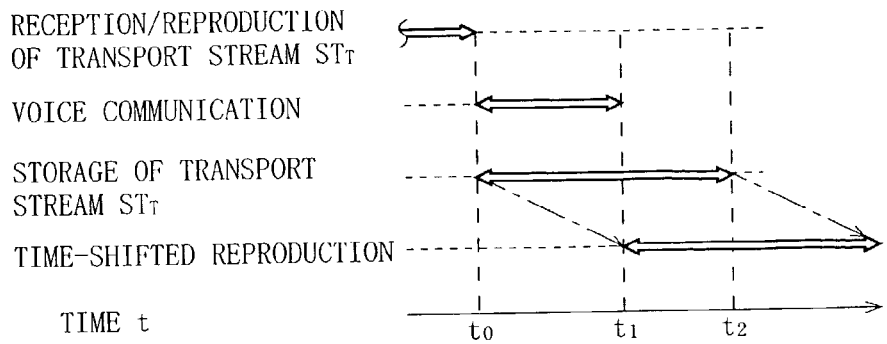
FIG. 23 is a timing chart showing an outline of an operation of the terminal device $E_7$ of FIG. 22.

Next, an operation of the terminal device $E_7$ described above is outlined with reference to FIG. 23. In FIG. 23, the user is prevented from viewing the object content during the time period from $t_0$ to $t_1$ due to voice communication, as in the cases described above. The terminal device $E_7$ writes the received transport stream $ST_T$ in the content storage section 9 after time $t_1$ until at least time $t_2$ at which the broadcast of the object content is finished. After disconnection of the voice communication (time $t_1$), the terminal device $E_7$ reads the transport stream $ST_T$ stored in the content storage section 9 and reproduces at the normal speed. This read is performed sequentially from the head of the portion of the object content missed by the user due to the voice communication and displayed for the view by the user. Therefore, the terminal device $E_7$ displays the object content stored in the content storage section 9 for the user from time $t_1$ until time $t_3$ at which read of the object content from the content storage section 9 is finished. In other words, after the voice communication, the terminal device $E_7$ performs time-shifted reproduction of the content along the time axis shifted from the actual broadcast time by time $(t_1-t_0)$.

Figure 24:
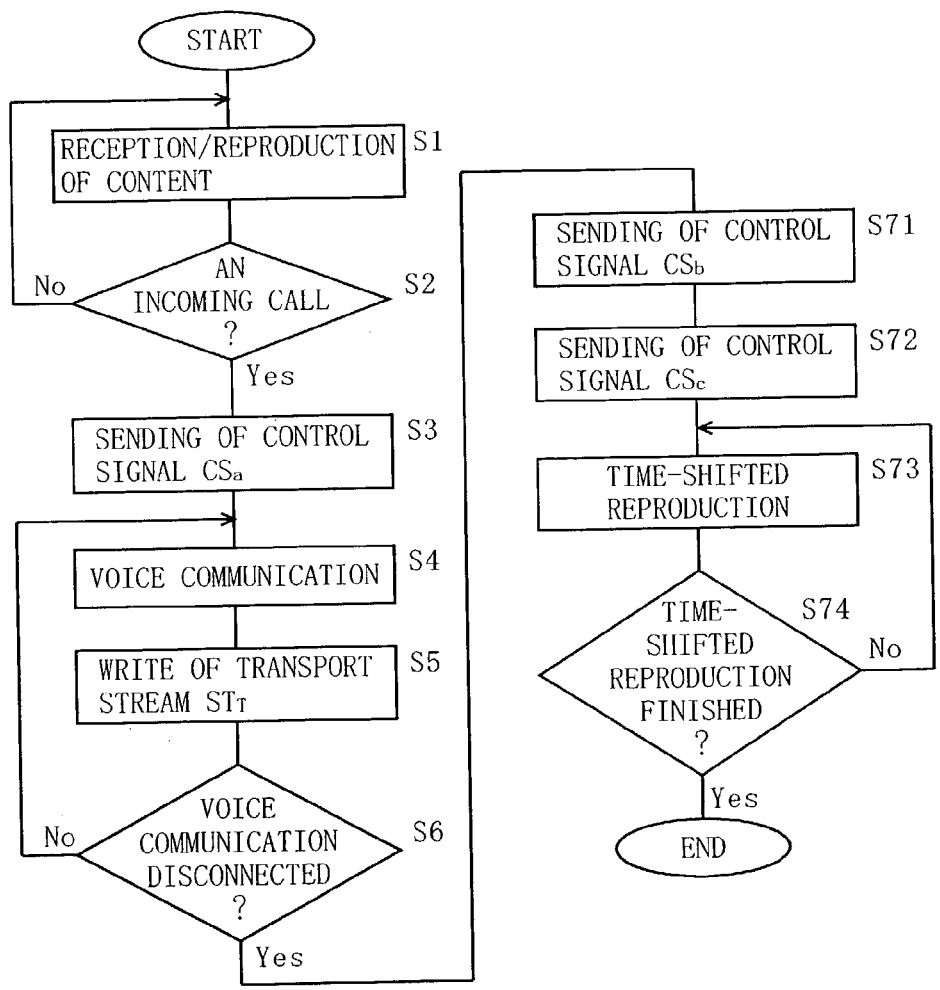
FIG. 24 is a flowchart showing the detailed operation of the terminal device $E_7$ of FIG. 22.

The operation outlined above with reference to FIG. 23 will be described in detail with reference to the flowchart of FIG. 24. The flowchart of FIG. 24 is the same as that of FIG. 3, except that steps S71 to S74 are included in place of steps S7 to S12. Therefore, in FIG. 24, the same steps as those in FIG. 3 are denoted by the same step numbers, and the description thereof is omitted here.

If it is determined that the voice communication has been disconnected in step S6, meaning that time $t_1$ (see FIG. 23) has been detected, the processor 82 generates and sends the control signal $CS_b$ described above in relation to step S21 in FIG. 6 (step S71). With this control signal, the image switch section 3 and the voice switch section 5 are set to the respective states described above in relation to step S21. The processor 82 also changes the input line of the TS switch section 13 to the control section 8 side by sending the control signal $CS_c$ to the TS switch section 13 (step S72). As described above in relation to step S22 in FIG. 6, the control signal $CS_c$ is also sent to the video decoder 15 and the audio decoder 16 to set the reproduction speed thereof at the normal speed.

The processor 82 then reads the transport stream $ST_T$ stored in the content storage section 9 and transfers the stream to the TS switch section 13. By this transfer, the portion of the object content missed by the user due to the voice communication is sequentially read from the head thereof. The demultiplexer 14 demultiplexes the transport stream $ST_T$ transferred via the TS switch section 13, and outputs the resultant encoded video signal $CSL_V$ and encoded audio signal $CSL_A$ to the video decoder 15 and the audio decoder 16, respectively. The video decoder 15 reproduces the video signal $SL_V$, which is output to the display device 4 via the image switch section 3. The audio decoder 16 reproduces the audio signal $SL_A$, which is output to the speaker 6 via the voice switch section 5. At the same time, the transport stream $ST_T$ output from the tuner 12 continues to be written in the content storage section 9 under the control of the processor 82. In this way, the terminal device $E_7$ performs time-shifted reproduction (step S73). By the processing in step S73, an image of the content missed by the user due to the voice communication is displayed from the head thereof on the display device 4 at the normal speed, while audio synchronizing with the video is output from the speaker 6.

Thereafter, the processor 82 determines whether or not the time-shifted reproduction is finished (step S74). If not finished, execution of step S73 is repeated. If the time-shifted reproduction is finished, the processing shown in FIG. 24 is terminated.

By the processing described above, the operation outlined with reference to FIG. 23 is obtained. That is, the terminal device $E_7$ writes the transport stream $ST_T$ in the content storage section 9 from the start point of voice communication (that is, time $t_0$). From the end point of the voice communication (that is, time $t_1$), the terminal device $E_7$ starts time-shifted reproduction of the portion of the object content missed by the user and stored in the content storage section 9, from the head of the portion. In this way, it is possible to provide a communications terminal device capable of outputting the portion of the content missed by the user due to the voice communication at a time shifted from the actual broadcast time.

Figure 25:
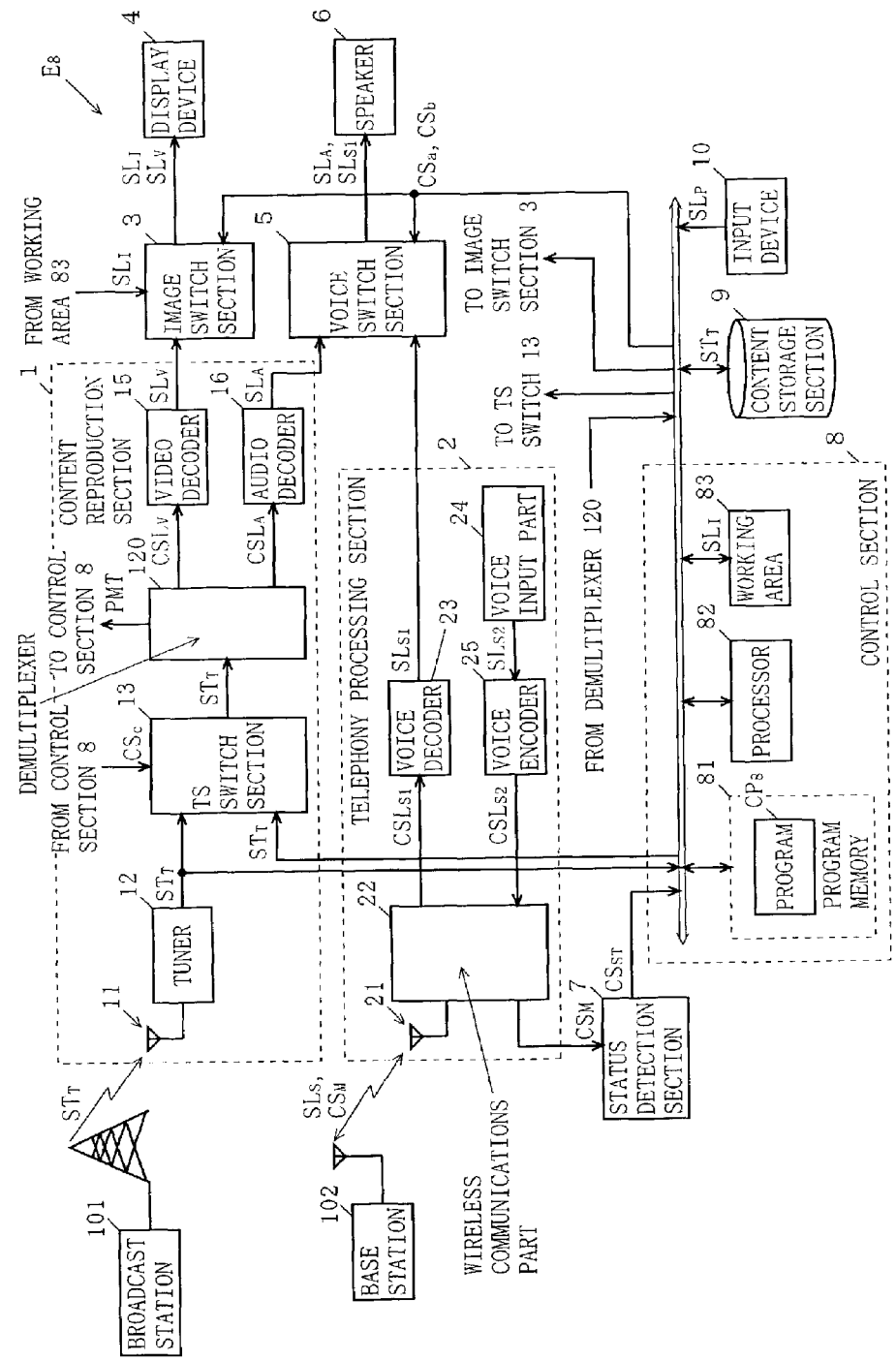
FIG. 25 is a block diagram showing the construction of a terminal device $E_8$ that is a seventh variant of the terminal device $E_1$ of FIG. 1.

FIG. 25 is a block diagram showing the construction of a mobile communications terminal device (hereinafter, referred to as a terminal device for simplification) $E_8$ as a seventh variant of the terminal device $E_1$ described above. In FIG. 25, the terminal device $E_8$ has the same construction as the terminal device $E_1$, except that a demultiplexer 120 is included in place of the demultiplexer 14 and that a computer program (hereinafter, referred to as a program for simplification) $CP_8$ is stored in the program memory 81. In FIG. 25, therefore, the same components as those of the terminal device $E_1$ in FIG. 1 are denoted by the same reference numerals, and the description thereof is omitted here.

The demultiplexer 120 demultiplexes the transport stream $ST_T$ output from the TS switch section 13, and outputs the resultant encoded video signal $CSL_V$ and encoded audio signal $CLS_A$ to the video decoder 15 and the audio decoder 16, respectively, as does the demultiplexer 14. By this demultiplexing, the demultiplexer 120 also obtains a program map table (PMT) including at least the broadcast end time of the receiving content, and sends the PMT to the processor 82.

The program $CP_8$ is the same in configuration as the program $CP_1$. By executing the program $CP_8$, however, the terminal device $E_8$ performs some processing items different from those performed by the terminal device $E_1$. This will be described below with reference to FIGS. 26 and 27.

Figure 26:
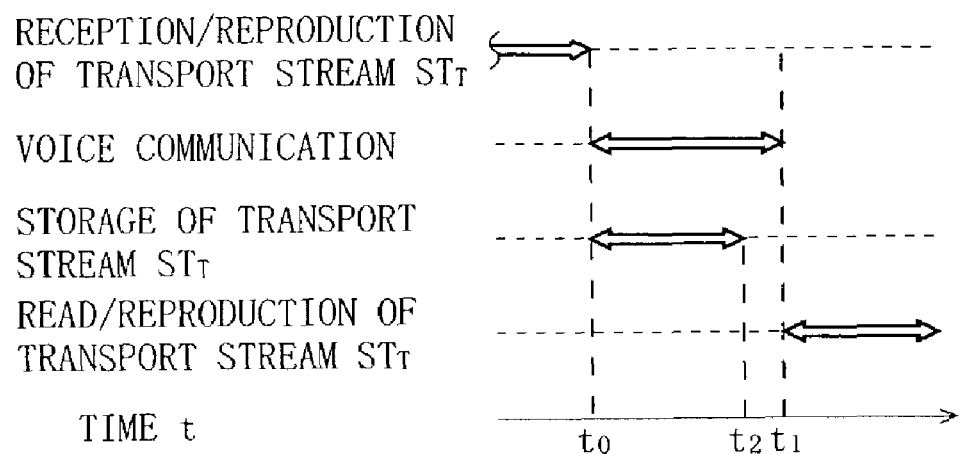
FIG. 26 is a timing chart showing an outline of an operation of the terminal device $E_8$ of FIG. 25.

Next, an operation of the terminal device $E_8$ described above is outlined with reference to FIG. 26. In FIG. 26, the user has voice communication during the time period from $t_0$ to $t_1$, as in the above cases. If the object content finish at time $t_2$ that is between time $t_0$ and time $t_1$, the processor 82 terminates the write of the object content in the content storage section 9.

Figure 27:
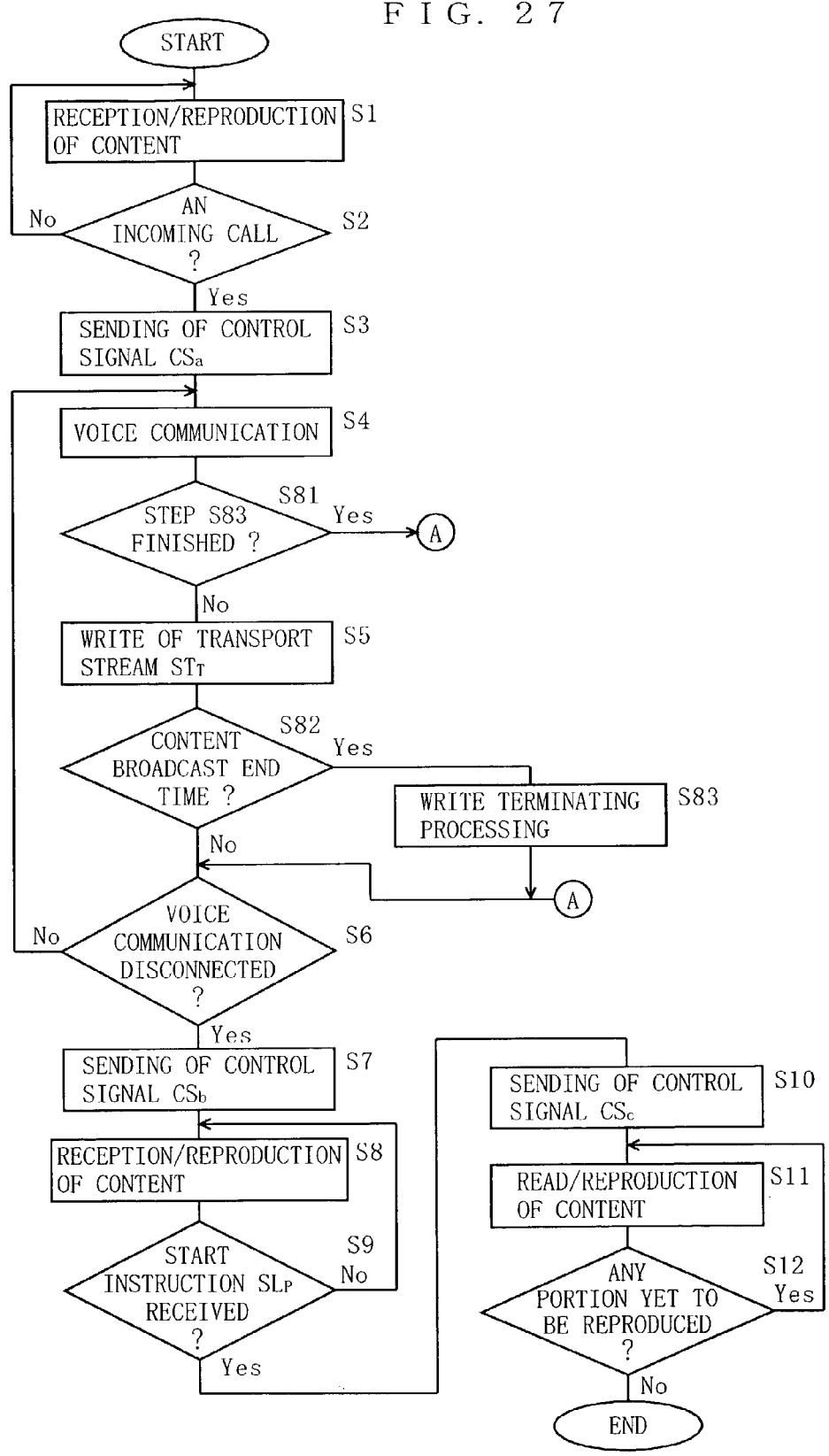
FIG. 27 is a flowchart showing a detailed operation of the terminal device $E_8$ of FIG. 25.

The operation of the terminal device $E_8$ outlined above with reference to FIG. 26 will be described in more detail with reference to the flowchart of FIG. 27. The flowchart of FIG. 27 is the same as that of FIG. 3, except that steps S81 to S83 are additionally included. Therefore, in FIG. 27, the same steps as those in FIG. 3 are denoted by the same step numbers, and the description thereof is omitted here.

After step S4, the processor 82 determines whether or not write terminating processing has been executed in step S83 (step S81). If not executed, the processor 82 proceeds to step S5. If the write terminating processing has been executed, the write of the received transport stream $ST_T$ in the content storage section 9 is no more necessary. Therefore, the processor 82 skips step S5 and the following some steps and proceeds to step S6.

After step S5, the processor 82 determines whether or not the broadcast end time of the object content has come based on the PMT sent from the demultiplexer 120 (step S82). If determining that the broadcast end time has not come, the processor 82 proceeds to step S6. If it is determined that the broadcast end time has come, the processor 82 terminates the write of the object content in the content storage section 9 (step S83). In other words, the processor 82 discards the transport stream $ST_T$ sent from the tuner 12, not transferring this to the content storage section 9. The processor 82 then performs step S6. By the processing described above, the write of the object content in the content storage section 9 is terminated upon end of the broadcast of the object content. This enables recording/reproduction suitable for the content storage section 9 whose recording capacity is small.

Although the terminal device $E_8$ was described as a variant of the terminal device $E_1$, it may be a variant of any of the terminals $E_2$ to $E_7$.

When a switch (not shown) is provided between the tuner 12 and the TS switch section 13, the processor 82 may control this switch to block the transport stream $ST_T$ output from the tuner 12 from being input into the control section 8 in step S83.

In this variant, the processor 82 determines whether or not the end time of the object content has come based on the PMT. If an electric program guide (EPG) is obtainable, the processor 82 may determine whether or not the end time of the object content has come based on this obtained EPG.

In the embodiment and the variants described above, the processor 82 may detect the remaining recording capacity of the content storage section 9, determine the bit rate for the write of the object content based on the detected remaining capacity, and then store the object content in the content storage section 9 according to the determined bit rate.

In the embodiment and the variants described above, a program stream converted from the transport stream $ST_T$ may be stored in the content storage section 9. Otherwise, an MPEG4-encoded transport stream $ST_T$ may be stored in the content storage section 9.

While the invention has been described in detail, the foregoing description is in all aspects illustrative and not restrictive. It is understood that numerous other modifications and variations can be devised without departing from the scope of the invention.

What is claimed is:

1. A communications terminal device comprising:
   a tuner operable to receive a transport stream transmitted from a broadcast station, the transport stream containing a content;
   a telephony processing section operable to receive and reproduce, by radio-wave, at least voice of a party on the other end of a voice communication;
   a status detection section operable to detect a status change of the voice communication in said telephony processing section;
   a content storage section operable to store the transport stream transmitted from the broadcast station;
   a TS switch section operable to switch between the transport stream received from the broadcast station and the transport stream having been stored in said content storage section;
   a reproduction section operable to reproduce either one of the transport stream received from the broadcast station and the transport stream having been stored in said content storage section;
   a first input device operable to receive, from a user, preselection information indicating a channel and a broadcast start time of a content the user wants to view; and
   a preselection storage section operable to store the preselection information,
   wherein, when the broadcast start time of the content, which is indicated by the preselection information, arrives during the voice communication, the content storage section starts storing the transport stream broadcasted on the channel indicated by the preselection information.

2. The communications terminal device according to claim 1, further comprising a second input device for receiving a start instruction, wherein
   when the status detection section detects a disconnection of the voice communication, the content storage section ends storing the transport stream received from the broadcast station, and the reproduction section reproduces the transport stream received from the broadcast station, and
   in accordance with the start instruction inputted after the disconnection of the voice communication is detected, the reproduction section starts reproducing the content stored in the content storage section.

3. The communication terminal device according to claim 1,
   wherein, when said status detection section detects a disconnection of the voice communication, said reproduction section sequentially reproduces the transport stream having been stored in said content storage section, and
   wherein, when the transport stream having been stored in said content storage section is reproduced until the transport stream having been stored in said content storage section aligns with the transport stream currently being output by said tuner, said content storage section ends storing the transport stream received from the broadcast station, and said TS switch section switches, in reproduction, from the transport stream having been stored in said content storage section to the transport stream received from the broadcast station.

4. The communications terminal device according to claim 3, further comprising:
   an image generation section operable to generate image information relating to the voice communication; and
   an image combining section operable to generate combined image information by combining the content received by said tuner and the image information generated by said image generation section when said status detection section detects a start of the voice communication,
   wherein said image combining section is operable to generate the combined image information to which an image of the party on the other end of the voice communication is additionally included.

5. The communications terminal device according to claim 4,
wherein said telephony processing section is further operable to capture an image of the user side, and
wherein said image combining section is operable to generate the combined image information to which the captured image of the user is additionally included.

6. The communications terminal device according to claim 3,
wherein said reproduction section is operable to reproduce at least audio constituting the received content, and
wherein said communications terminal device further comprises:
a mute detection section operable to detect a mute time period of voice communication; and
a voice switch section operable to output the audio reproduced by said reproduction section during the mute time period detected by said mute detection section,
wherein said voice switch section is further operable to output a voice signal reproduced by said telephony processing section when said mute detection section detects no mute time period.

* * * * *